US012748173B2

(12) United States Patent
Manolakos et al.

(10) Patent No.: US 12,748,173 B2
(45) Date of Patent: Sep. 29, 2026

(54) METHODS AND APPARATUS FOR MEASUREMENT REPORTING BASED ON MULTIPATH CHARACTERISTICS OF POSITIONING REFERENCE SIGNAL RESOURCES

(71) Applicant: QUALCOMM Incorporated, San Diego, CA (US)

(72) Inventors: Alexandros Manolakos, Escondido, CA (US); Mukesh Kumar, Hyderabad (IN); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 18/575,266

(22) PCT Filed: Jun. 2, 2022

(86) PCT No.: PCT/US2022/031933

§ 371 (c)(1),
(2) Date: Dec. 28, 2023

(87) PCT Pub. No.: WO2023/014430

PCT Pub. Date: Feb. 9, 2023

(65) Prior Publication Data

US 2024/0329182 A1 Oct. 3, 2024

(30) Foreign Application Priority Data

Aug. 5, 2021 (GR) .............................. 20210100538

(51) Int. Cl.
*G01S 5/02* (2010.01)
*G01S 5/00* (2006.01)

(52) U.S. Cl.
CPC .......... *G01S 5/0218* (2020.05); *G01S 5/0036* (2013.01); *G01S 5/0063* (2013.01); *G01S 5/0236* (2013.01)

(58) Field of Classification Search
CPC .... G01S 5/0036; G01S 5/0063; G01S 5/0218; G01S 5/0236; G01S 5/0273;
(Continued)

(56) References Cited

U.S. PATENT DOCUMENTS

2021/0144735 A1 5/2021 Manolakos et al.
2023/0397151 A1* 12/2023 Meng .................... H04W 64/00

FOREIGN PATENT DOCUMENTS

WO 2021092072 A1 5/2021

OTHER PUBLICATIONS

International Search Report and Written Opinion—PCT/US2022/031933—ISA/EPO—Aug. 29, 2022.
(Continued)

*Primary Examiner* — Timothy X Pham
(74) *Attorney, Agent, or Firm* — Thien T. Nguyen

(57) ABSTRACT

A network node supports position measurement determination for a user equipment (UE) by prioritizing positioning reference signal (PRS) resource measurements to be included in a location information report based on multipath characteristics of the PRS resources. The network node, for example, may be the UE, a base station, or a sidelink UE. The PRS resource measurements may be prioritized by determining a subset of available PRS resource measurements to include in and/or the order of inclusion in the location information report. The multipath characteristics of each PRS resource may be the number, a strength metric, or a time domain span of the multipath components, or any combination thereof. A location server may request the prioritization of the PRS resource measurements based on
(Continued)

the multipath characteristics of the PRS resources and may use the order of the PRS resource measurements in the position determination for the UE.

34 Claims, 11 Drawing Sheets

(58) Field of Classification Search
CPC ... H04L 5/0007; H04L 5/0048; H04L 5/0053; H04L 5/0094; H04W 64/00
See application file for complete search history.

(56) References Cited

OTHER PUBLICATIONS

Nokia., et al., "Views on Enhancing DL AoD ", 3GPP TSG RAN WG1 #105-e, R1-2105514, 3rd Generation Partnership Project (3GPP), Mobile Competence Centre, 650, Route Des Lucioles, F-06921 Sophia-Antipolis Cedex, France, vol. RAN WG1, No. e-Meeting, May 10, 2021-May 27, 2021, May 11, 2021, 10 Pages, XP052006396, paragraph [02.2], Figure 4.

* cited by examiner

METHODS AND APPARATUS FOR MEASUREMENT REPORTING BASED ON MULTIPATH CHARACTERISTICS OF POSITIONING REFERENCE SIGNAL RESOURCES

CROSS REFERENCE TO RELATED APPLICATIONS

This application is a National Stage Application filed under 35 U.S.C. § 371 of PCT International Application Serial No. PCT/US2022/031933 entitled "METHODS AND APPARATUS FOR MEASUREMENT REPORTING BASED ON MULTIPATH CHARACTERISTICS OF POSITIONING REFERENCE SIGNAL RESOURCES" and filed on Jun. 2, 2022, which claims the benefit of Greek Patent Application No. 20210100538, entitled "METHODS AND APPARATUS FOR MEASUREMENT REPORTING BASED ON MULTIPATH CHARACTERISTICS OF POSITIONING REFERENCE SIGNAL RESOURCES" and filed on Aug. 5, 2021, which are expressly incorporated herein by reference in their entirety.

BACKGROUND OF THE DISCLOSURE

1. Field of the Disclosure

Aspects of the disclosure relate generally to positioning for user equipment (UE), and in particular for reporting positioning measurements of positioning reference signal resources with multipath components.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users.

Network nodes, such as a user equipment (UE), base station, or sidelink UEs, may measure positioning reference signal (PRS) resources for position determination of the UE. The measurement information for the PRS resources may be reported in a location information report to a location server for position determination.

SUMMARY

A network node supports position measurement determination for a user equipment (UE) by prioritizing positioning reference signal (PRS) resource measurements to be included in a location information report based on multipath characteristics of the PRS resources. The network node, for example, may be the UE, a base station, or a sidelink UE. The PRS resource measurements may be prioritized by determining a subset of available PRS resource measurements to include in the location information report and/or the order that the PRS resource measurements are included in the location information report. The multipath characteristics of each PRS resource may be the number of multipath components, a strength metric of the multipath components, a time domain span of the multipath components, or any combination thereof. A location server may request prioritization of the PRS resource measurements based on the multipath characteristics of the PRS resources and may use the order of the PRS resource measurements in the position determination for the UE.

In one implementation, a method performed by a location server in a wireless network for position determination of a user equipment (UE) in the wireless network, includes sending positioning assistance data for the UE to a network node comprising configuration information for a plurality of positioning reference signal (PRS) resources for the network node to measure; sending a request to the network node indicating that the network node is to determine a subset of the plurality of the PRS resources for which measurement information is to be included in a location information report based on measured multipath characteristics of the PRS resources; receiving the location information report from the network node including the measurement information for the subset of the plurality of the PRS resources based on the measured multipath characteristics of the PRS resources.

In one implementation, a location server in a wireless network configured for position determination of a user equipment (UE) in the wireless network, includes an external interface configured to communicate with entities in the wireless network; at least one memory; at least one processor coupled to the external interface and the at least one memory, wherein the at least one processor is configured to: send, via the external interface, positioning assistance data for the UE to a network node comprising configuration information for a plurality of positioning reference signal (PRS) resources for the network node to measure; send, via the external interface, a request to the network node indicating that the network node is to determine a subset of the plurality of the PRS resources for which measurement information is to be included in a location information report based on measured multipath characteristics of the PRS resources; receive, via the external interface, the location information report from the network node including the measurement information for the subset of the plurality of the PRS resources based on the measured multipath characteristics of the PRS resources.

In one implementation, a location server in a wireless network configured for position determination of a user equipment (UE) in the wireless network, includes means for sending positioning assistance data for the UE to a network node comprising configuration information for a plurality of positioning reference signal (PRS) resources for the network node to measure; means for sending a request to the network node indicating that the network node is to determine a subset of the plurality of the PRS resources for which measurement information is to be included in a location information report based on measured multipath characteristics of the PRS resources; means for receiving the location information report from the network node including the measurement information for the subset of the plurality of the PRS resources based on the measured multipath characteristics of the PRS resources.

In one implementation, a non-transitory storage medium including program code stored thereon, the program code is operable to configure at least one processor in a location server in a wireless network for position determination of a user equipment (UE) in the wireless network, the program code comprising instructions to: send positioning assistance data for the UE to a network node comprising configuration information for a plurality of positioning reference signal (PRS) resources for the network node to measure; send a request to the network node indicating that the network node is to determine a subset of the plurality of the PRS resources for which measurement information is to be included in a location information report based on measured multipath characteristics of the PRS resources; receive the location information report from the network node including the measurement information for the subset of the plurality of the PRS resources based on the measured multipath characteristics of the PRS resources.

In one implementation, a method performed by a network node in a wireless network for position measurement determination for a user equipment (UE), includes receiving positioning assistance data for the UE from a location server comprising configuration information for a plurality of positioning reference signal (PRS) resources for the network node to measure; obtaining measurement information for the PRS resources received from other entities in the wireless network; measuring multipath characteristics of the PRS resources; determining a subset of the plurality of the PRS resources for which measurement information is to be included in a location information report based on measured multipath characteristics of the PRS resources; and sending the location information report to the location server including the measurement information for the subset of the plurality of the PRS resources determined based on the measured multipath characteristics of the PRS resources.

In one implementation, a network node in a wireless network configured for position measurement determination for a user equipment (UE), includes an external interface comprising at least one of a wireless transceiver and a communications interface configured to communicate with other entities in the wireless network; at least one memory; at least one processor coupled to the external interface and the at least one memory, wherein the at least one processor is configured to: receive, via the external interface, positioning assistance data for the UE from a location server comprising configuration information for a plurality of positioning reference signal (PRS) resources for the network node to measure; obtain, via the external interface, measurement information for the PRS resources received from the other entities in the wireless network; measure multipath characteristics of the PRS resources; determine a subset of the plurality of the PRS resources for which measurement information is to be included in a location information report based on measured multipath characteristics of the PRS resources; and send, via the external interface, the location information report to the location server including the measurement information for the subset of the plurality of the PRS resources determined based on the measured multipath characteristics of the PRS resources.

In one implementation, a network node in a wireless network configured for position measurement determination for a user equipment (UE), includes means for receiving positioning assistance data for the UE from a location server comprising configuration information for a plurality of positioning reference signal (PRS) resources for the network node to measure; means for obtaining measurement information for the PRS resources received from other entities in the wireless network; means for measuring multipath characteristics of the PRS resources; means for determining a subset of the plurality of the PRS resources for which measurement information is to be included in a location information report based on measured multipath characteristics of the PRS resources; and means for sending the location information report to the location server including the measurement information for the subset of the plurality of the PRS resources determined based on the measured multipath characteristics of the PRS resources.

In one implementation, a non-transitory storage medium including program code stored thereon, the program code is operable to configure at least one processor in a network node in a wireless network for position measurement determination for a user equipment (UE), the program code comprising instructions to: receive positioning assistance data for the UE from a location server comprising configuration information for a plurality of positioning reference signal (PRS) resources for the network node to measure; obtain measurement information for the PRS resources received from other entities in the wireless network; measure multipath characteristics of the PRS resources; determine a subset of the plurality of the PRS resources for which measurement information is to be included in a location information report based on measured multipath characteristics of the PRS resources; and send the location information report to the location server including the measurement information for the subset of the plurality of the PRS resources determined based on the measured multipath characteristics of the PRS resources.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1A:
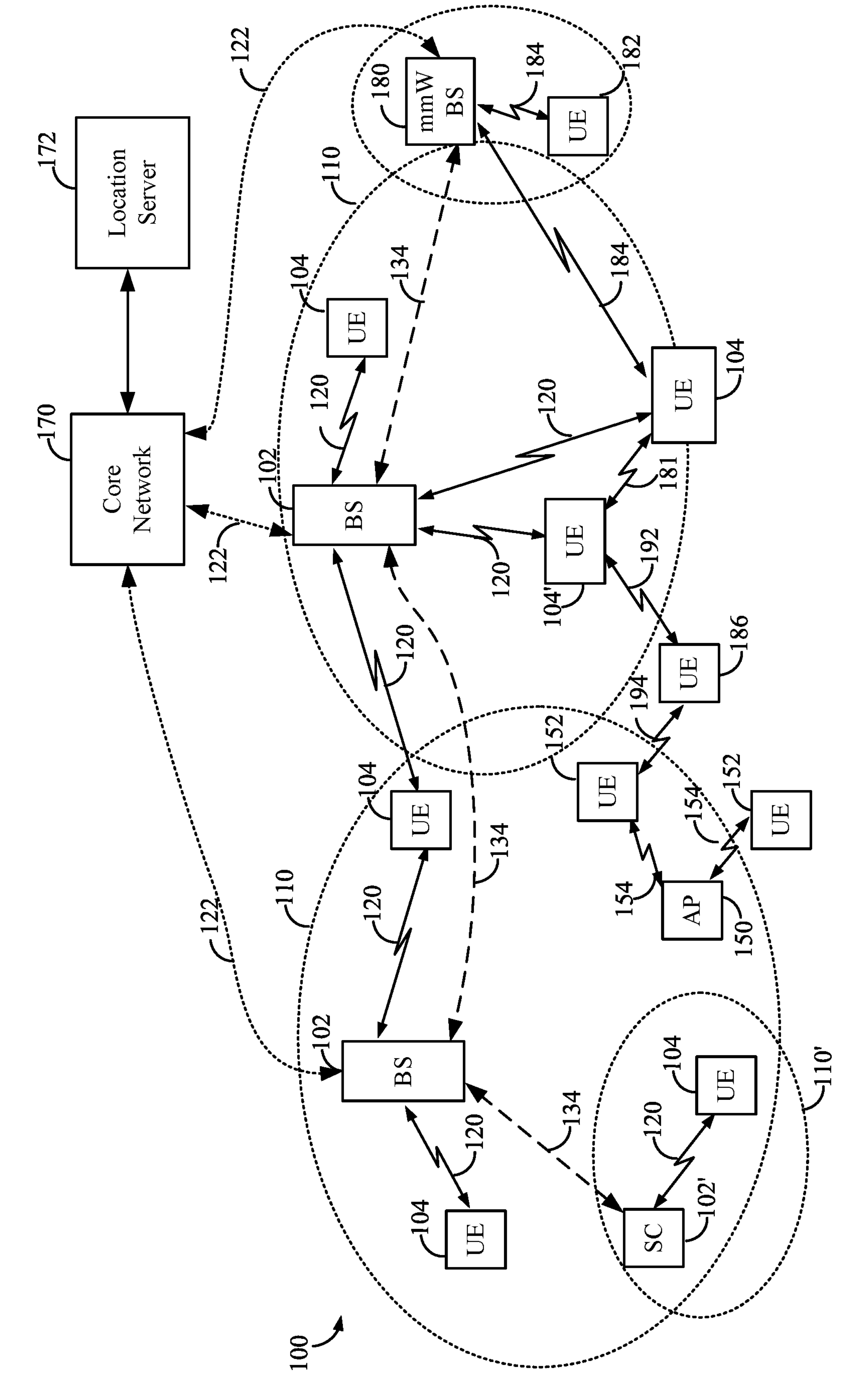
FIG. 1A illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "base station", and "transmission point (TRP)" are not intended to be specific or otherwise limited to any particular Radio Access Technology (RAT), unless otherwise noted. In general, a UE may be any wireless communication device (e.g., a mobile phone, router, tablet computer, laptop computer, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station or transmission point (TRP) may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel. A communication link through which UEs can send signals to other UEs is called a sidelink (SL) channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them to the location server without a request), may provide assistance data to the UE (e.g. if requested by the UE or in the absence of a request) and may request a location estimate or location measurements from a UE, e.g. for the Global Navigation Satellite System (GNSS), Time Difference Of Arrival (TDOA), Angle of Departure (AOD), Round-Trip Time (RTT) and multi cell RTT (Multi-RTT), and/or Enhanced Cell ID (ECID) position methods. Assistance data may be used by a UE to acquire and measure GNSS and/or reference signals, such as positioning reference signals (PRS) signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AOD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AOD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

A location server and a base station (e.g. an eNodeB (eNB) for LTE access or an NR NodeB (gNB) for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (which may be referred to as NPPa or NRPPa) protocol may be used to transfer such messages between a base station that is a gNodeB and a location server that is an LMF.

During positioning using signaling in LTE and 5G NR, a UE typically acquires dedicated positioning signals transmitted by base stations, referred to as a Positioning Reference Signals (PRS), which are used to generate the desired measurements for the supported positioning technique. Positioning Reference Signals (PRS) are defined for 5G NR positioning to enable UEs to detect and measure more neighbor base stations or TRPs. Other types of signals, i.e., signals that are not dedicated for positioning, may be used by the UE for positioning. Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
|---|---|---|
| Rel. 16 DL PRS | DL RSTD | DL-TDOA |

TABLE 1-continued

| DL/UL Reference Signals | UE Measurements | To facilitate support of the following positioning techniques |
|---|---|---|
| Rel. 16 DL PRS | DL PRS RSRP | DL-TDOA, DL-AOD, Multi-RTT |
| Rel.16 DL PRS/Rel.16 SRS for positioning | UE Rx-Tx time difference | Multi-RTT |
| Rel. 15 SSB/CSI-RS for RRM | SS-RSRP(RSRP for RRM), SS-RSRQ(for RRM), CSI-RSRP (for RRM), CSI-RSRQ (for RRM) | E-CID |

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR, and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message.

Positioning procedures, e.g., in the NG-RAN, are modelled as transactions of the LPP protocol. A procedure, for example, consists of a single operation of one of the following types: exchange of positioning capabilities; transfer of assistance data; transfer of location information (positioning measurements and/or position estimate); error handling; and abort.

During a positioning session, a UE may report its capabilities to process reference signals, such as PRS, in the exchange of positioning capabilities. The UE may receive positioning assistance data to perform PRS measurements in the transfer of assistance data. The assistance data provided to the UE, however, may include configurations for significantly more PRS resources than the UE is capable of processing. For example, the UE may be capable of processing up to 5 PRS resources, whereas the positioning assistance data may include 20 PRS resources to measure. The assistance data may sort the PRS according to priority for measurement by a UE. For example, when a UE is configured in the assistance data of a positioning method with a number of PRS resources beyond its capability, e.g., for AOD, TDOA, MRTT, etc., the UE may assume the DL-PRS Resources in the assistance data are sorted in a decreasing order of measurement priority and, in the above-example, may process the first 5 PRS resources listed in the positioning assistance data.

Thus, in the positioning assistance data, the positioning frequency layer (PFL), the TRPs within the frequency layer, the PRS resource set within the TRP, and the PRS resources within the PRS resource set may be prioritized by the location server. The specific order of the PFL/TRP/PRS resource set/PRS resources in the assistance data defines the prioritization of the PRS resources to be measured by the UE. The prioritization in the assistance data helps the UE with the initial acquisition of PRS signals or fast acquisition.

There are no requirements related to how the UE reports the measurements of the PRS resources, e.g., the order of the measurement information for PRS resources, or whether measurement information is included, etc. For example, if the UE measures three PRS resources: PRS1, PRS2, PRS3, the UE may report the measurement information associated with the PRS resources in any order, e.g., (PRS1, PRS 2, PR3), (PRS3, PRS2, PRS1), (PRS 2, PRS 1, PRS 3), etc.

Moreover, the UE may be able to determine that some PRS measurements are better than other PRS measurements. For example, some PRS resources may include a number of multipath channels. The Channel Energy Response (CER) for some PRS resources, for example, may include a good line of sight (LOS), but may include one or more multipath components, in which the energy is distributed across several lobes. The presence of multipath components in some PRS resources may render some PRS measurements less useful than PRS measurements for PRS resources that include few or no multipath components.

Accordingly, as described herein, a network node, such as a target UE, a base station, or a sidelink UE, may prioritize PRS resource measurements based on multipath characteristics of the PRS resources for the location information report. The network node, for example, may measure the multipath characteristics of PRS resources and determine a subset of the PRS resource measurements to include in the location information report, and/or the order of the PRS resource measurements in the location information report, to the location server for determining the position of the target UE. The network node may provide the measurement information of the selected subset of PRS resources in the location information report based on the measured multipath characteristics of the PRS resources. For example, in some implementations, measurement information for PRS resources may be included in the location information report based on the number of multipath components, the strength of the multipath components, the time domain span of multipath components, or a combination thereof. In some implementations, the order of the measurement information for the PRS resources may be based on the measured multipath characteristics of the PRS resources, e.g., based on the number of multipath components, the strength of the multipath components, the time domain span of multipath components, or a combination thereof. In some implementations, the location server may send a request to the network node indicating that the network node should prioritize the measurement information for the location information report based on the measured multipath characteristics of the PRS resources. The network node may further include in the location information report the number of multipath components associated with each PRS resource. The location server may determine a position estimate for the UE using the prioritized order of the PRS resource measurements in the location information report.

FIG. 1 illustrates an exemplary wireless communications system 100, in which network nodes may include or order positioning measurements of PRS resources for a target UE in a location information report to a location server 172 based on measured multipath characteristics of the PRS resources, as described herein. The wireless communications system 100 (which may also be referred to as a wireless wide area network (WWAN)) may include various network nodes, including base stations and UEs. The base stations 102, sometimes referred to as TRPs 102, may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 or TRPs may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e.., 40 MHz), compared to that attained by a single 20 MHz carrier.

The wireless communications system 100 may further include one or more UEs, such as UE 186, that connects indirectly to one or more communication networks via one or more device-to-device (D2D) peer-to-peer (P2P) links. In the example of FIG. 1, UE 186 has a D2D P2P link 192 with one of the UEs 104 connected to one of the base stations 102 (e.g., through which UE 186 may indirectly obtain cellular connectivity) and a D2D P2P link 194 with WLAN STA 152 connected to the WLAN AP 150 (through which UE 186 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 104 that may communicate with a macro cell base station 102 over a communication link 120 and/or the mmW base station 180 over a mmW communication link 184. For example, the macro cell base station 102 may support a PCell and one or more SCells for the UE 104 and the mmW base station 180 may support one or more SCells for the UE 104. The UE 104 may further communicate with one or more other sidelink UEs 104' via a sidelink communication link 181.

Figure 1B:
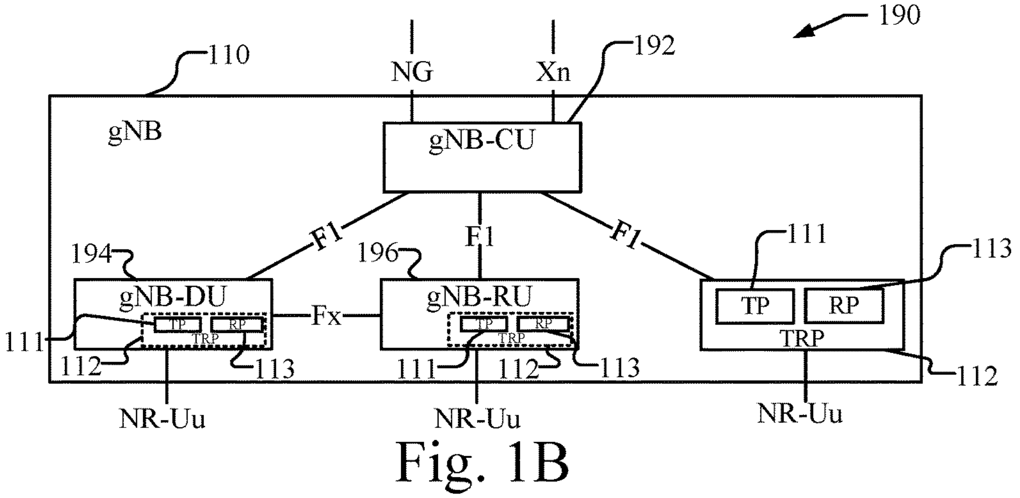
FIG. 1B shows an architecture diagram of an NG-RAN node that includes a gNB Central Unit, a gNB Distributed Unit, and gNB Remote Unit.

FIG. 1B shows an architecture diagram of an NG-RAN node 190 that may be within an NG-RAN in FIG. 1A, e.g., as a separate entity or as part of another gNB. The NG-RAN node 190 may be a gNB 102, according to one implementation. The architecture shown in FIG. 1B, for example, may be applicable to any gNB 102 in FIG. 1A.

As illustrated, gNB 102 may include a gNB Central Unit (gNB-CU) 192, a gNB Distributed Unit (gNB-DU) 194, a gNB Remote Unit (gNB-RU) 196, which may be physically co-located in the gNB 102 or may be physically separate. The gNB-CU 192 is a logical or physical node hosting support for Radio Resource Control (RRC), Service Data Adaptation Protocol (SDAP) and Packet Data Convergence Protocol (PDCP) protocols of the gNB 102 used over the NR Uu air interface and controlling the operation of one or more gNB-DUs and/or gNB-RUs. The gNB-CU 192 terminates an F1 interface connected with a gNB-DU and in some implementations, an F1 interface connected with a gNB-RU. As illustrated, the gNB-CU 192 may communicate with an AMF via an NG interface. The gNB-CU 192 may further communicate with one or more other gNBs 102 via an Xn interface. The gNB-DU 194 is a logical or physical node hosting support for Radio Link Control (RLC), Medium Access Control (MAC) and Physical (PHY) protocol layers used over the NR Uu air interface of the gNB 102, operation of which is partly controlled by gNB-CU 192. The gNB-DU terminates the F1 interface connected with the gNB-CU 192, and may terminate a lower layer split point interface Fx with a gNB-RU. The gNB-RU 196 may be based on a lower layer function split and is a logical or physical node hosting support for lower layer functions, such as PHY and Radio Frequency (RF) protocol layers used over the NR Uu air interface of the gNB 102, operation of which is partly controlled by gNB-CU 192 and/or gNB-DU 194. The gNB-RU 196 terminates the Fx interface connected with the gNB-DU 194 and in some implementations may terminate the F1 interface connected with the gNB-CU 192.

The gNB-CU 192 requests positioning measurements (e.g. E-CID) to the gNB-DU 194 and/or gNB-RU 196. The gNB-DU 194 and/or gNB-RU 196 may report the measurements back to the gNB-CU 192. A gNB-DU 194 or gNB-RU 196 may include positioning measurement functionality. It should be understood that a separate measurement node is not precluded.

Additionally, as illustrated in FIG. 1B, gNB 102 may include a Transmission Point (TP) 111 and a Reception Point (RP) 113 combined into a Transmission Reception Point (TRP) 112, which may be physically or logically located in the gNB 102. The gNB-CU 192 may be configured to communicate with the TP 111 and RP 113, e.g., via F1 interfaces. The gNB-CU 192, thus, controls one or more TPs 111 and RPs 113 which are accessible from the gNB-CU 192 via an F1 interface.

In some embodiments, the NG-RAN node 190 (or gNB 102) may comprise a subset of the elements shown in FIG. 1B. For example, the NG-RAN node 190 may comprise the gNB-CU 192 but may not include one or more of gNB-DU 194 and gNB-RU 196, RP 113 or TP 111. Alternatively, NG-RAN node 190 may include one or more of gNB-DU 194 and, RP 113 or TP 111 but may not include gNB-RU 196. Further, the elements shown in FIG. 1B may be logically separate but physically co-located or may be partially or completely physically separate. For example, one or more of gNB-DU 194 and/or gNB-RU 196, RP 113 or TP 111 may be physically separate from gNB-CU 192 or may be physically combined with gNB-CU 192. In the case of physical separation, the F1 or Fx interface may define signaling over a physical link or connection between two separated elements. In some implementations, gNB-CU 192 may be split into a control plane portion (referred to as a CU-CP or gNB-CU-CP) and a user plane portion (referred to as CU-UP or gNB-CU-UP). In this case, both the gNB-CU-CP and gNB-CU-UP may interact with gNB-DU 194 and/or gNB-RU 196 to support NR Uu air interface signaling for control plane and user plane, respectively. However, only the gNB-CU-CP may interact with TPs 111 and RPs 113 to support and control location related communication.

Protocol layering between the gNB-CU 192 and the TP 111, and RP 113 may be based on F1 C as defined in 3GPP TS 38.470, which uses an F1 Application Protocol (F1AP) at the top level as specified in 3GPP TS 38.473. New messages to support positioning could be added directly into F1AP or could be introduced in a new location specific protocol which is transported using F1AP.

The location procedures with the gNB-CU 192 may comprise all location related procedures on NG, Xn, and NR-Uu interfaces. For example, the location procedures between AMF 115 and the NG-RAN node 190 may use NGAP. The location procedures between NG-RAN node 190 and other NG-RAN nodes, e.g., gNBs 102, may use XnAP or a protocol above XnAP, such as an extended NR Positioning Protocol A (NRPPa) as defined in 3GPP TS 38.455. The location procedures between NG-RAN node 190 and UE 104 may use RRC and/or LPP.

The corresponding messages to support positioning may be carried inside a transparent F1AP message transfer container. For example, the Transfer of an NGAP Location Reporting Control and NAS Transport message may be carried in an UL/DL NGAP Message Transfer. The Transfer of location related XnAP messages may be carried in an UL/DL XnAP Message Transfer. The Transfer of location related RRC(LPP) messages may be carried in an UL/DL RRC (LPP) Message Transfer.

Figure 2A:
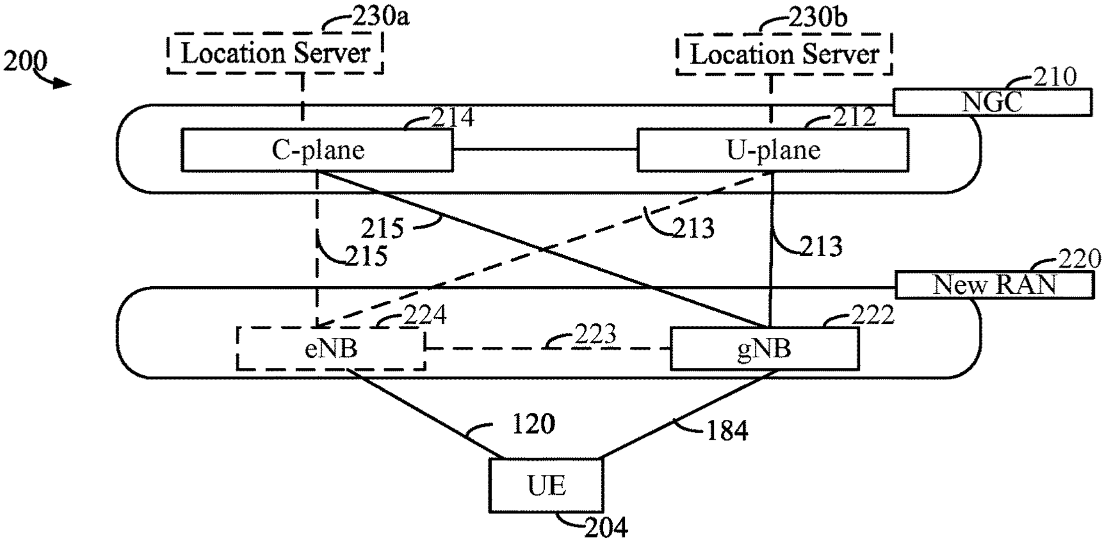
FIGS. 2A and 2B illustrate example wireless network structures, according to various aspects of the disclosure.

FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1A). Another optional aspect may include one or more location servers 230*a,* 230*b* (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
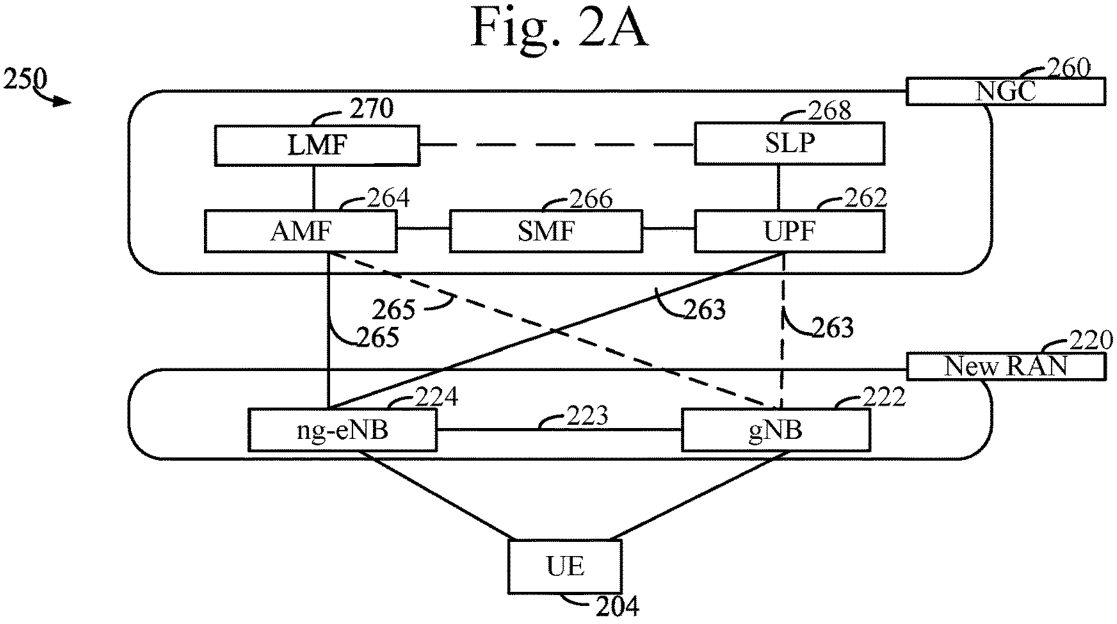

FIG. 2B illustrates another example wireless network structure 250. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e.., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1A). The base stations of the New RAN 220 communicate with the AMF 264 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
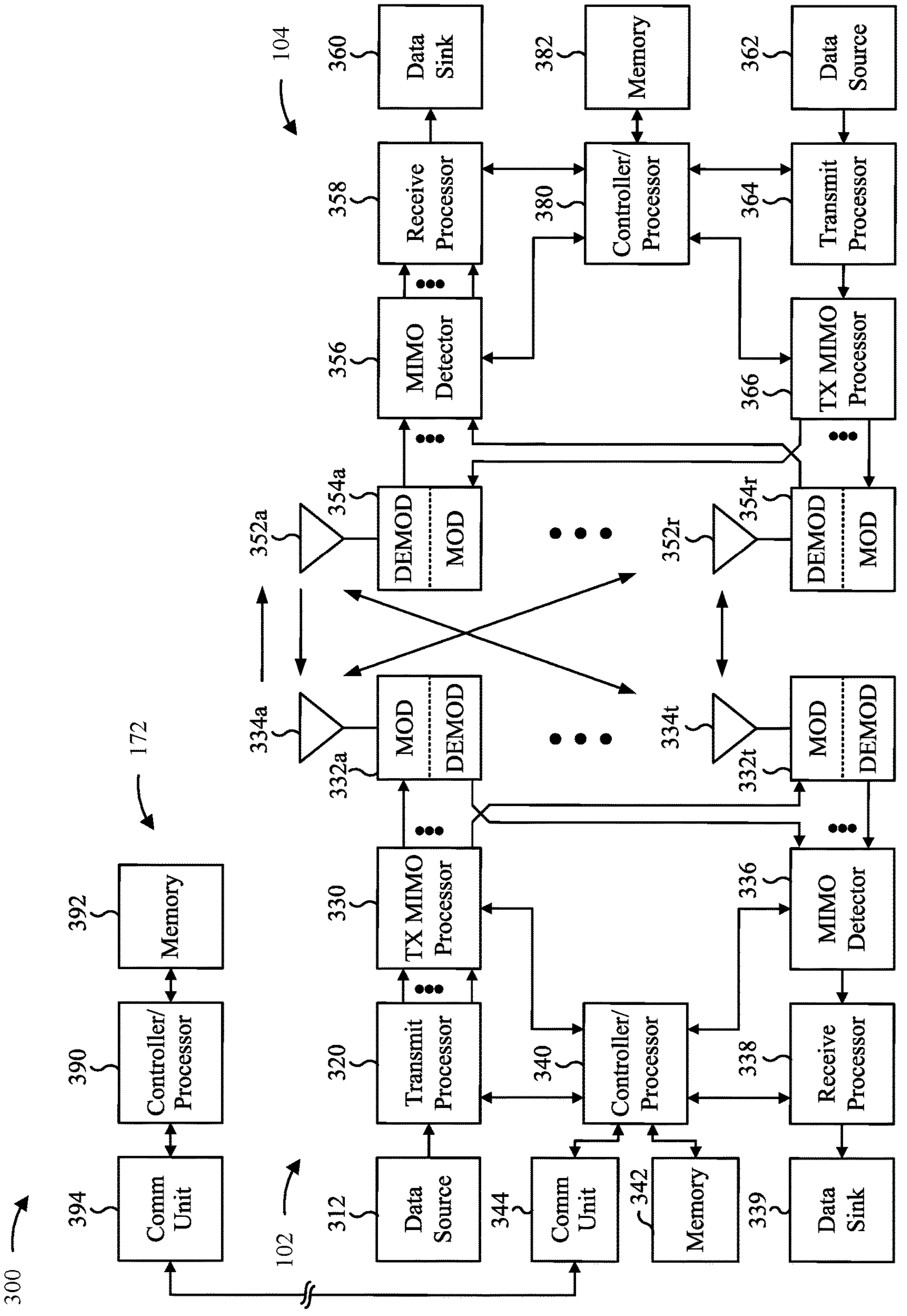
FIG. 3 illustrates a block diagram of a design of base station and user equipment (UE), which may be one of the base stations and one of the UEs in FIG. 1.

FIG. 3 shows a block diagram of a design 300 of base station 102 and UE 104, which may be one of the base stations and one of the UEs in FIG. 1A. Base station 102 may be equipped with T antennas 334*a* through 334*t*, and UE 104 may be equipped with R antennas 352*a* through 352*r*, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332*a* through 332*t*. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332*a* through 332*t* may be transmitted via T antennas 334*a* through 334*t*, respectively. According to various aspects described in more detail below, the synchronization signals can be generated with location encoding to convey additional information.

At UE 104, antennas 352*a* through 352*r* may receive the downlink signals from base station 102 and/or other base stations and may provide received signals to demodulators (DEMODs) 354*a* through 354*r*, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354*a* through 354*r*, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354*a* through 354*r* (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to location server 172 via communication unit 344. Location server 172 130 may include communication unit 394, controller/processor 390, and memory 392.

Controller/processor 340 of base station 102, controller/processor 380 of UE 104, controller/processor 380 of location server 172 and/or any other component(s) of FIG. 3 may perform one or more techniques associated with prioritization of PRS resource measurements based on the multipath characteristics of the PRS resources for the location information report, as described in more detail herein. For example, controller/processor 340 of base station 102, controller/processor 380 of UE 104, controller/processor 380 of location server 172 and/or any other component(s) of FIG. 3 may perform or direct operations of, for example, signaling flow 700 of FIG. 7, process 1000 of FIG. 10, and process 1100 of FIG. 11, and/or other processes as described herein. Memories 342, 382, 392 may store data and program codes for base station 102, UE 104, and location server 172, respectively. In some aspects, memory 342, memory 382, and/or memory 392 may comprise a non-transitory computer-readable medium storing one or more instructions for wireless communication. For example, the one or more instructions, when executed by one or more processors of the base station 102, the UE 104, and/or location server 172 may perform or direct operations of, for example, signaling flow 700 of FIG. 7, process 1000 of FIG. 10, and process 1100 of FIG. 11, and/or other processes as described herein.

As indicated above, FIG. 3 is provided as an example. Other examples may differ from what is described with regard to FIG. 3.

Figure 4:
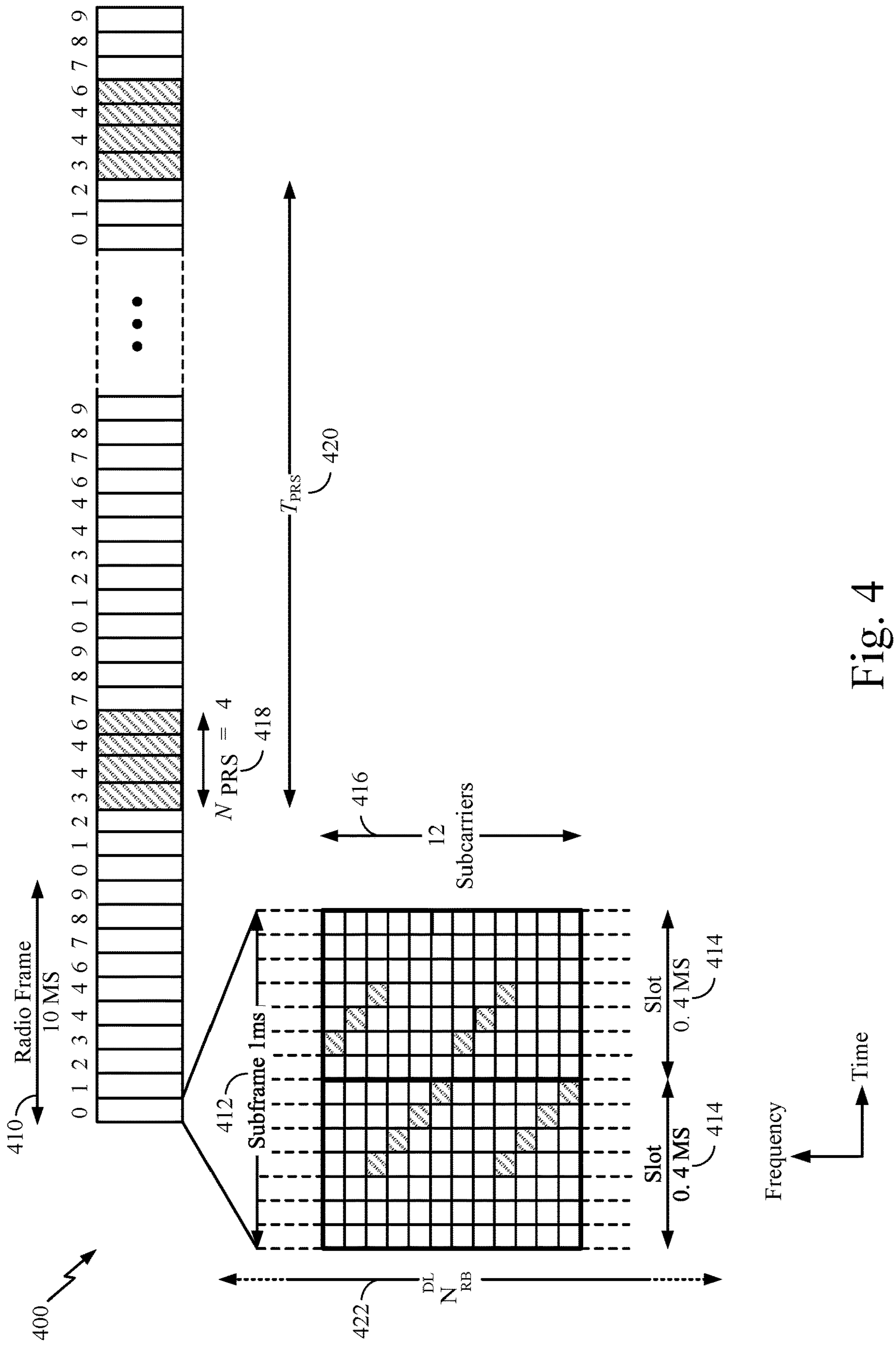
FIG. 4 is a diagram of a structure of an exemplary subframe sequence with positioning reference signal (PRS) positioning occasions.

FIG. 4 shows a structure of an exemplary subframe sequence 400 with positioning reference signal (PRS) positioning occasions, according to aspects of the disclosure. Subframe sequence 400 may be applicable to the broadcast of PRS signals from a base station (e.g., any of the base stations described herein) or other network node. The subframe sequence 400 may be used in LTE systems, and the same or similar subframe sequence may be used in other communication technologies/protocols, such as 5G and NR. In FIG. 4, time is represented horizontally (e.g., on the X axis) with time increasing from left to right, while frequency is represented vertically (e.g., on the Y axis) with frequency increasing (or decreasing) from bottom to top. As shown in FIG. 4, downlink and uplink radio frames 410 may be of 10 millisecond (ms) duration each. For downlink frequency division duplex (FDD) mode, radio frames 410 are organized, in the illustrated example, into ten subframes 412 of 1 ms duration each. Each subframe 412 comprises two slots 414, each of, for example, 0.5 ms duration.

In the frequency domain, the available bandwidth may be divided into uniformly spaced orthogonal subcarriers 416 (also referred to as "tones" or "bins"). For example, for a normal length cyclic prefix (CP) using, for example, 15 kHz spacing, subcarriers 416 may be grouped into a group of twelve (12) subcarriers. A resource of one OFDM symbol length in the time domain and one subcarrier in the frequency domain (represented as a block of subframe 412) is referred to as a resource element (RE). Each grouping of the 12 subcarriers 416 and the 14 OFDM symbols is termed a resource block (RB) and, in the example above, the number of subcarriers in the resource block may be written as $$N_{SC}^{RB} = 12.$$

For a given channel bandwidth, the number of available resource blocks on each channel 422, which is also called the transmission bandwidth configuration 422, is indicated as $$N_{RB}^{DL}.$$

For example, for a 3 MHz channel bandwidth in the above example, the number of available resource blocks on each channel 422 is given by $$N_{RB}^{DL} = 15.$$

Note that the frequency component of a resource block (e.g., the 12 subcarriers) is referred to as a physical resource block (PRB).

A base station may transmit radio frames (e.g., radio frames 410), or other physical layer signaling sequences, supporting PRS signals (i.e., a downlink (DL) PRS) according to frame configurations either similar to, or the same as that, shown in FIG. 4, which may be measured and used for a UE (e.g., any of the UEs described herein) position estimation. Other types of wireless nodes (e.g., a distributed antenna system (DAS), remote radio head (RRH), UE, AP, etc.) in a wireless communications network may also be configured to transmit PRS signals configured in a manner similar to (or the same as) that depicted in FIG. 4.

A collection of resource elements that are used for transmission of PRS signals is referred to as a "PRS resource." The collection of resource elements can span multiple PRBs in the frequency domain and N (e.g., 1 or more) consecutive symbol(s) within a slot 414 in the time domain. For example, the cross-hatched resource elements in the slots 414 may be examples of two PRS resources. A "PRS resource set" is a set of PRS resources used for the transmission of PRS signals, where each PRS resource has a PRS resource identifier (ID). In addition, the PRS resources in a PRS resource set are associated with the same transmission-reception point (TRP). A PRS resource ID in a PRS resource set is associated with a single beam transmitted from a single TRP (where a TRP may transmit one or more beams). Note that this does not have any implications on whether the TRPs and beams from which signals are transmitted are known to the UE.

PRS may be transmitted in special positioning subframes that are grouped into positioning occasions. A PRS occasion is one instance of a periodically repeated time window (e.g., consecutive slot(s)) where PRS are expected to be transmitted. Each periodically repeated time window can include a group of one or more consecutive PRS occasions. Each PRS occasion can comprise a number $N_{PRS}$ of consecutive positioning subframes. The PRS positioning occasions for a cell supported by a base station may occur periodically at intervals, denoted by a number $T_{PRS}$ of milliseconds or subframes. As an example, FIG. 4 illustrates a periodicity of positioning occasions where $N_{PRS}$ equals 4 418 and $T_{PRS}$ is greater than or equal to 20 420. In some aspects, $T_{PRS}$ may be measured in terms of the number of subframes between the start of consecutive positioning occasions. Multiple PRS occasions may be associated with the same PRS resource configuration, in which case, each such occasion is referred to as an "occasion of the PRS resource" or the like.

A PRS may be transmitted with a constant power. A PRS can also be transmitted with zero power (i.e.., muted). Muting, which turns off a regularly scheduled PRS transmission, may be useful when PRS signals between different cells overlap by occurring at the same or almost the same time. In this case, the PRS signals from some cells may be muted while PRS signals from other cells are transmitted (e.g., at a constant power). Muting may aid signal acquisition and time of arrival (TOA) and reference signal time difference (RSTD) measurement, by UEs, of PRS signals that are not muted (by avoiding interference from PRS signals that have been muted). Muting may be viewed as the non-transmission of a PRS for a given positioning occasion for a particular cell. Muting patterns (also referred to as muting sequences) may be signaled (e.g., using the LTE positioning protocol (LPP)) to a UE using bit strings. For example, in a bit string signaled to indicate a muting pattern, if a bit at position j is set to '0', then the UE may infer that the PRS is muted for a $j^{th}$ positioning occasion.

To further improve hearability of PRS, positioning subframes may be low-interference subframes that are transmitted without user data channels. As a result, in ideally synchronized networks, PRS may be interfered with by other cells' PRS with the same PRS pattern index (i.e., with the same frequency shift), but not from data transmissions. The frequency shift may be defined as a function of a PRS ID for a cell or other transmission point (TP) (denoted as $$N_{ID}^{PRS})$$

or as a function of a physical cell identifier (PCI) (denoted as $$N_{ID}^{cell})$$

if no PRS ID is assigned, which results in an effective frequency re-use factor of six (6).

To also improve hearability of a PRS (e.g., when PRS bandwidth is limited, such as with only six resource blocks corresponding to 1.4 MHz bandwidth), the frequency band for consecutive PRS positioning occasions (or consecutive PRS subframes) may be changed in a known and predictable manner via frequency hopping. In addition, a cell supported by a base station may support more than one PRS configuration, where each PRS configuration may comprise a distinct frequency offset (vshift), a distinct carrier frequency, a distinct bandwidth, a distinct code sequence, and/or a distinct sequence of PRS positioning occasions with a particular number of subframes ($N_{PRS}$) per positioning occasion and a particular periodicity ($T_{PRS}$). In some implementation, one or more of the PRS configurations supported in a cell may be for a directional PRS and may then have additional distinct characteristics, such as a distinct direction of transmission, a distinct range of horizontal angles, and/or a distinct range of vertical angles.

A PRS configuration, as described above, including the PRS transmission/muting schedule, is signaled to the UE to enable the UE to perform PRS positioning measurements. The UE is not expected to blindly perform detection of PRS configurations.

Note that the terms "positioning reference signal" and "PRS" may sometimes refer to specific reference signals that are used for positioning in LTE/NR systems. However, as used herein, unless otherwise indicated, the terms "positioning reference signal" and "PRS" refer to any type of reference signal that can be used for positioning, such as but not limited to, PRS signals in LTE/NR, navigation reference signals (NRS), transmitter reference signals (TRS), cell-specific reference signals (CRS), channel state information reference signals (CSI-RS), primary synchronization signals (PSS), secondary synchronization signals (SSS), etc.

Similar to DL PRS transmitted by base stations, discussed above, a UE may transmit UL PRS for positioning to base stations and/or sidelink UEs. The UL PRS may be sometimes referred to as sounding reference signals (SRS), or SRS for positioning. Using received DL PRS from base stations, SRS transmitted to base stations, SRS transmitted to SL UEs, the various RAT dependent positioning measurements may be performed for position determination of the target UE. LTE systems, for example, use DL PRS for Observed Time Difference of Arrival (OTDOA) positioning measurements. NR systems, on the other hand, may use DL PRS for several different kinds of RAT dependent positioning measurements, such as time difference of arrival (TDOA), angle of departure (AOD), and may use DL PRS and SRS jointly to perform multi-cell positioning measurements, such as multi-cell Round Trip Time (M-RTT). Other types of RAT dependent positioning measurements that may be used for a position estimate for a UE include, e.g., time of arrival (TOA), reference signal time difference (RSTD), reference signal received power (RSRP), time difference between reception and transmission of signals (Rx-Tx), or angle of arrival (AoA). Other positioning methods exist, including methods that do not rely on PRS. For example, Enhanced Cell-ID (E-CID) is based on radio resource management (RRM) measurements.

With a UE assisted position method, UE 104 may obtain location measurements and send the measurements to a location server, e.g., location server 230*a*, 230*b*, or LMF 270) for computation of a location estimate for UE 104. For example, the location measurements may include one or more of a TDOA, AOD, M-RTT, etc. With a UE based position method, UE 104 may obtain location measurements (e.g., which may be the same as or similar to location measurements for a UE assisted position method) and may compute a location of UE 104 (e.g., with the help of assistance data received from a location server such as location server 230*a*, 230*b*, or LMF 270). With a network based position method, one or more base stations 102 or APs or sidelink UEs may obtain location measurements (e.g., measurements of UL-TDOA, Rx-Tx, for signals transmitted by UE 104, and/or may receive measurements obtained by UE 104, and may send the measurements to a location server for computation of a location estimate for UE 104. The base stations 102 and/or sidelink UEs 104 may provide information to the location server that may include timing and configuration information for PRS transmission and location coordinates. The location server may determine the position of the UE based on the received measurement information or may provide some or all of this information to the UE 104 as positioning assistance data to aid in detection and measurement of PRS signals from one or more base stations. The assistance data may further include locations of the base stations, which may be used by the UE 104 to calculate a position estimate in a UE based positioning process.

As discussed above, assistance data may provide a prioritization for measurement to be performed, e.g., if the UE is not capable of processing all PRS resources included in the assistance data. For example, the positioning assistance data provided by a location server to a network node may prioritize the positioning frequency layer (PFL), the TRPs within the frequency layer, the PRS resource set within the TRP, and the PRS resources within the PRS resource set. The specific order of the PFL/TRP/PRS resource set/PRS resources in the assistance data defines the prioritization of the PRS resources to be measured by the UE.

The network node reports the measurement information for the measured PRS resource in a location information report that is sent to the location server. There are no specific requirements as to which PRS resources the network nodes includes in the location information report or the order of the PRS resources that are included in the location information report.

Some PRS measurements, however, may be more useful for position determination. For example, measurements of PRS resources that include a large number of multipath channels, in which energy is distributed across several lobes, may be less useful for position determination than measurements of PRS resources with no or limited multipath channels. For example, multipath corresponds to reflections that occurred over other objects, and therefore the time-of arrival is not linearly dependent to the distance between the transmitter and receiver. Similarly the Angle of Arrival may be different than what it should have been for a direct line of sight path. Accordingly, the use of positioning measurements for PRS resources with many multipath components, weak multipath components, or multipath components with a large span in the time domain may decrease the accuracy of the position determination.

Figure 5A:
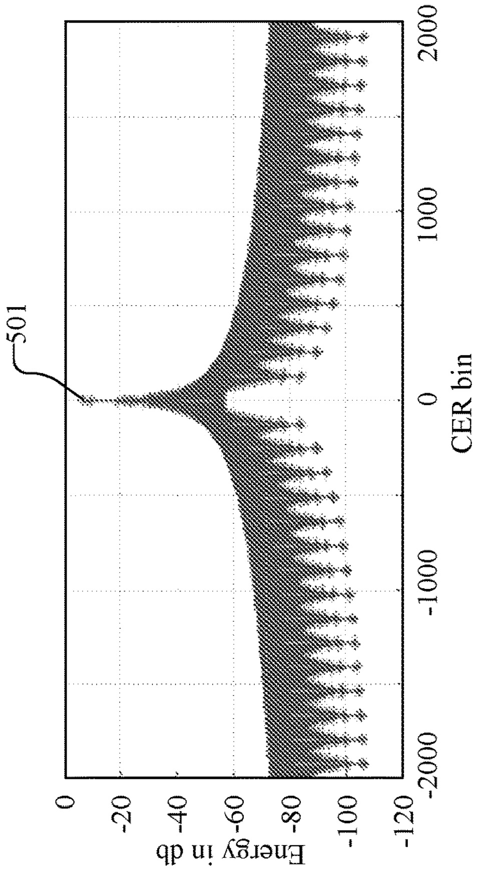
FIGS. 5A, 5B, 5C, and 5D illustrate the Channel Energy Response (CER) for different PRS resources illustrating multipath components for each PRS resource.
Figure 5B:
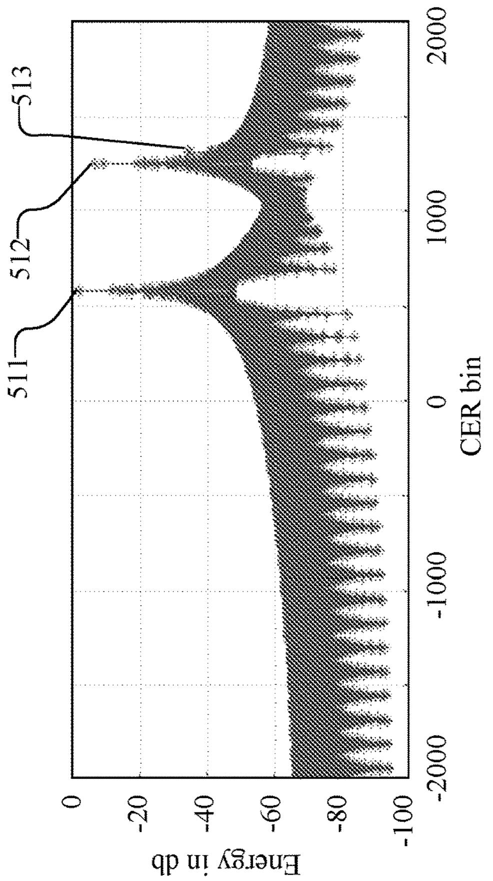
Figure 5C:
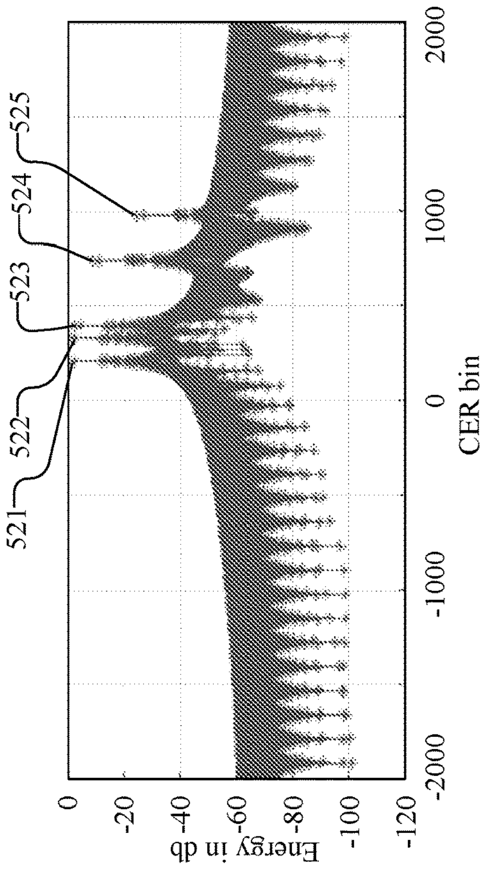
Figure 5D:
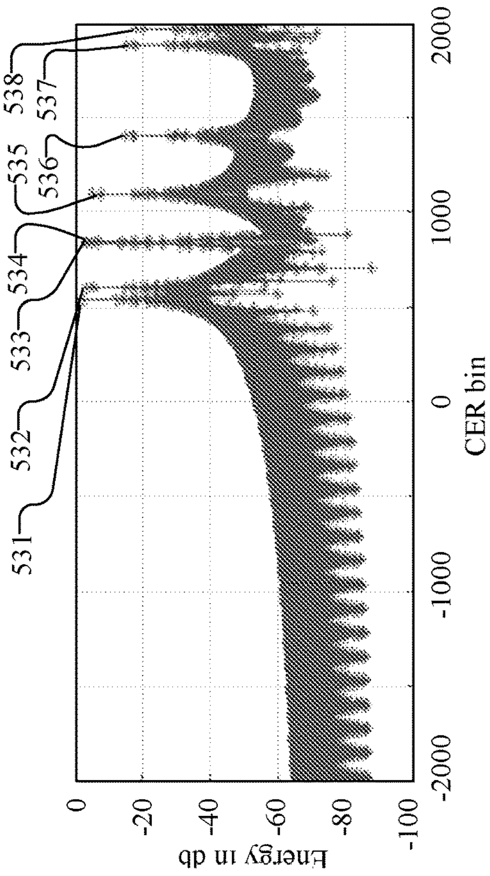

FIGS. 5A, 5B, 5C, and 5D, by way of example, illustrate graphs of the Channel Energy Response (CER) for four different PRS resources showing multipath components for each PRS resource as peaks. The CER graphs for the PRS resources in FIGS. 5A-5D illustrated energy in db along the Y axis with respect to CER bins along the X axis, which represents time. A network node, such as a UE 104, base station 102, or sidelink UE 104', may generate a CER for a PRS resource by jointly processing all the resource elements (REs) on the channel on which the PRS signal is transmitted and performing an inverse Fourier transform to convert the received RF signals to the time domain. The conversion of the received RF signals to the time domain is referred to as estimation of the CER. The CER shows peaks for PRS resource over time (e.g., in CER bins). A CER with multiple peaks is referred to as a multipath channel. The PRS resources may have a good line of sight (LOS) between the transmitting and receiving nodes, but may have several multipath components, which distributes the energy across multiple lobes or peaks. FIG. 5A, for example, illustrates the CER for a PRS resource with a single path, illustrated by the single peak 501. FIG. 5B, on the other hand, illustrates the CER for a PRS resource with three multipath components, illustrated by peaks 511, 512, and 513. FIG. 5C illustrates the CER for a PRS resource with five multipath components, illustrated by peaks 521, 522, 523, 524, and 525. FIG. 5D illustrates the CER for a PRS resource with eight multipath components, illustrated by peaks 531, 532, 533, 534, 535, 536, 537, and 538.

The PRS resources that produce fewer multipath components are generally preferred for positioning measurements. Thus, the PRS resource that produced the CER shown in FIG. 5A may be preferable to the PRS resource that produced the CER shown in FIG. 5B, 5C, or 5D, while the PRS resource that produced the CER shown in FIG. 5B may be preferable to the PRS resource that produced the CER shown in FIG. 5C or 5D, etc.

In implementations discussed herein, the multipath characteristics of PRS resources may be used to determine which PRS resource measurements to include in a location information report to a location server and/or the order of the PRS resource measurements that are included in the location information report to the location server.

To determine multipath characteristics of the PRS resources, the network node may first determine the number of multipath components for each PRS resource. The multipath components that are to be used for the determination of the prioritization of PRS resource measurements in the location information report should be relatively strong, e.g., greater than the noise level. Thus, the network node may identify multipath component candidates, e.g., in a CER, and use a strength metric for each multipath component candidate to determine if the multipath component candidate qualifies as a multipath component for the PRS resource. Thus, the network node may determine a strength metric for each multipath component candidate for a PRS resource and determine if the strength metric is greater than a threshold to determine if the multipath component candidate should be considered a multipath component. The strength metric, for example, may be a Signal to Noise Ratio (SNR) or a relative RSRP, such as a relative power of the multipath component candidate relative to a highest peak, a median power of the multipath components, a noise floor, etc.

Figure 6:
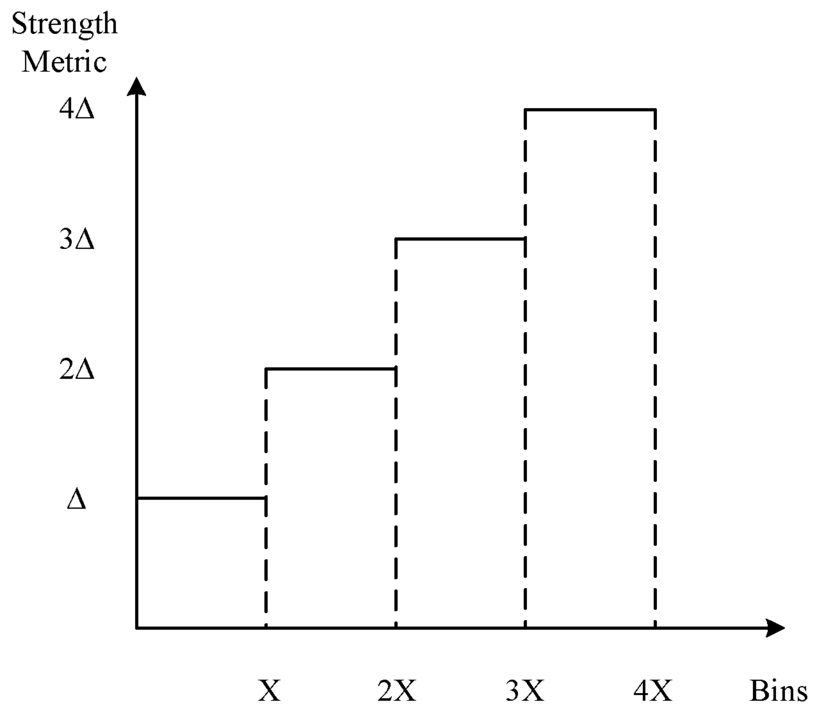
FIG. 6 illustrates a staircase function of a strength metric for multipath component candidates for determining the number of multipath components in a PRS resource.

FIG. 6, by way of example, illustrates a staircase function of the strength metric for multipath component candidates for determining the number of multipath components in a PRS resource by a network node. As illustrated, the network node may divide the strength metric, e.g., SNR or relative-RSRP, into a number of bins ($i*X-(i+1)*X$) having a range of strength metrics ($i*\Delta-(i+1)*\Delta$). Whether a multipath component candidate qualifies as a multipath component may be based on a predetermined threshold, e.g., only multipath component candidates in bins 2× or greater may be considered a multipath component. The number of multipath components for the PRS resource may be determined based on the number of multipath components with a strength metric greater than the threshold. Additionally, the strength metric for the multipath components may be defined by which bin the multipath components fall within. The strength metrics for each multipath component may be combined, e.g., averaged, summed, etc., to determine the multipath strength metric for the PRS resource to determine the prioritization of the PRS resource measurements for the location information report.

In some implementations, for position determination of the target UE 104, the location server 172 may send a message to a network node in the wireless network indicating the PRS resources to be included in the location information report. The message may indicate that a subset of the available PRS resources may be selected by the network node based on measured multipath characteristics of the PRS resources and included in the location information report. The message may additionally or alternatively indicate that PRS resource measurements may be ordered in the location information report based on measured multipath characteristics of the associated PRS resources.

The network node, for example, may be the target UE 104 and the PRS resources may include DL PRS transmitted by a base station 102, a sidelink PRS transmitted by a sidelink UE 104', or a combination thereof. In another example, the network node may be the base station 102, and the PRS resources may be SRS for positioning transmitted by the target UE 104. In another example, the network node may be a sidelink UE 104' and the PRS resources may be transmitted by the target UE 104.

The measured multipath characteristics of the PRS resources used for selecting PRS resource measurements to include in the location information report and/or the order of the PRS measurements in the location information report may include, by way of example, the number of multipath components detected, a strength metric of the multipath components, a time domain span of multipath components, or any combination thereof. Other multipath characteristics of the PRS resources may be used if desired.

For example, the message from the location server 172 may indicate that the network node is to include PRS resource measurements in the location information report if and only if the number of multipath components detected for the associated PRS resources is less than a threshold number. The threshold number, for example, may be any positive integer value from 1 to N, and may be provided by the location server 172 in the message, a separate message, or may be configured and stored in the network node.

The message from the location server 172, for example, may indicate that the network node is to order the PRS resource measurements in the location information report based on the number of multipath components detected. The network node may prioritize PRS resource measurements in the location information report based on the number of multipath components, e.g., with a single path PRS resource measurements (e.g., as illustrated in FIG. 5A) (if any) reported in a first position in the location information report, then two multipath PRS resource measurements (if any) reported in the next position in the location information report, followed by three multipath PRS resource measurements (e.g., as illustrated in FIG. 5B) (if any) reported in the next position in the location information report, etc.

The message from the location server 172 may additionally or alternatively indicate that the network node is to include and/or order PRS resource measurements in the location information report based on strength metric of the multipath components. For example, a PRS resource with three multipath components with a relatively high strength metric may be included in the location information report over a PRS resource with fewer multipath components that have a relatively low strength metric. Moreover, the ordering of the PRS resource measurements may be based on the signal strength metrics, e.g., with the PRS resource measurements having a relatively higher strength metric given propriety to PRS resources measurements with a relatively lower strength metric. The strength metric of the multipath components, for example, may be the relative power of the multipath components with respect to the earliest path, a median power of the multipath components with respect to the power of the earliest path, the median of the multipath component with respect to a noise floor of the CER, or any combination thereof.

The message from the location server 172 may additionally or alternatively indicate that the network node is to include and/or order PRS resource measurements in the location information report based on the time-domain space of the multipath components. For example, PRS resource measurements for a PRS resource with all multipath components close in time to each other, may be prioritized, i.e.., included in the location information report and/or in a higher order in the location information report than PRS resource measurements for a PRS resource with multipath components that span a relatively longer period of time. For example, FIG. 5B illustrates a PRS resource with three multipath components 511, 512, and 513, with multipath components 512 and 513 nearly overlapping, i.e., close in time. Thus, the PRS resource measurements from the PRS resource illustrated in FIG. 5B may be given priority over another PRS resource with three multipath components that are spread in time-domain space by a greater amount.

In some implementations a combination of any two or more of the multipath characteristics of the PRS resources may be used to prioritize PRS resource measurements to be included in and/or ordered in the location information report. For example, the inclusion and/or the order of the PRS resource measurements in the location information report may be based first on the number of multipath components, then on the strength metric of the multipath components and/or the spread in the time-domain space of the multipath components, e.g., the order of PRS resource measurements for PRS resources having the same number of multipath components may be determined based on the strength metric of the multipath components, then on the spread in the time-domain. If desired, various combinations and different orders of the multipath characteristics of the PRS resources may be used. Moreover, in some implementations, lower priority multipath characteristics of the PRS resources thresholds may be promoted to a higher priority if the multipath characteristics is greater than a predetermined threshold. For example, the number of multipath components may have a higher priority than the strength metric of the multipath components, but if the strength metric exceeds a predetermined threshold, the strength metric of the multipath components may be promoted to a higher priority than the number of multipath components. Thus, for example, a PRS resource measurement for a first PRS resource with fewer multipath components may be prioritized in the location information report over a PRS resource measurement for a second PRS resource with greater multipath components, unless the multipath strength metric (and/or the spread in time-domain space) for the second PRS resource is greater than the multipath strength metric (and/or the spread in time-domain space) for the first PRS resource by more than a predetermined threshold.

The network node may include the number of multipath components for a PRS resource, along with the PRS resource measurements, in the location information report. For example, referring to FIGS. 5A-5D, the first position in the location information report may include the PRS resource measurements, e.g., TOA, Rx-Tx measurements, etc., for the PRS resource illustrated in FIG. 5A with an indication that the path=1, the second position in the location information report may include the PRS resource measurements, for the PRS resource illustrated in FIG. 5B with an indication that the path=3, the third position in the location information report may include the PRS resource measurements, for the PRS resource illustrated in FIG. 5C with an indication that the path=5, and the fourth position in the location information report may include the PRS resource measurements, for the PRS resource illustrated in FIG. 5C with an indication that the path=8.

Figure 7:
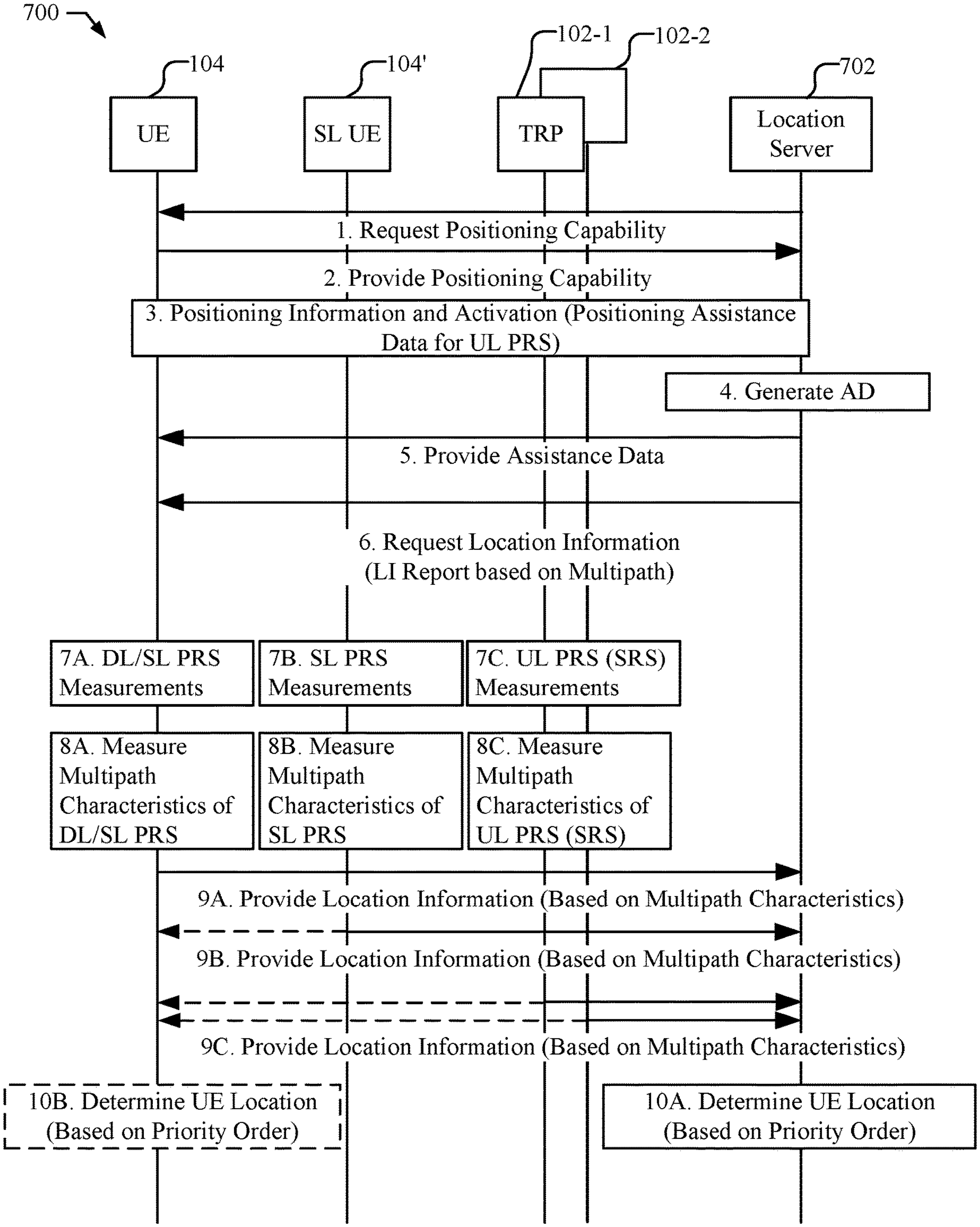
FIG. 7 is a signaling flow that illustrates various messages that may be sent between components of a wireless network during a positioning session that includes prioritization of PRS resource measurements based on multipath characteristics of the PRS resources for the location information report.

FIG. 7 shows a signaling flow 700 that illustrates various messages that may be sent between components of the wireless communication system 100 depicted in FIG. 1A, in a positioning session that includes prioritization of PRS resource measurements based on multipath characteristics of the PRS resources for the location information report, as discussed herein.

Signaling flow 700 illustrates a target UE 104, a sidelink (SL) UE 104', two TRPs 102-1, and 102-2, which may be collective referred to as TRPs 102, and may be gNBs or eNBs, and a location server 702, which may be, e.g., location server 172, 230*a*, 230*b*, or LMF 270. It should be understood that while a single location server 702 is illustrated in FIG. 7, multiple location servers or other entities may be used for different stages of FIG. 7. For example, a first server may receive positioning capabilities and generate and provide assistance data in stages 1, 2, 3, and 4, while a different server or other entity may receive location information and determine the UE location at stages 9A, 9B, 9C, and 10. While the signaling flow 700 is discussed, for ease of illustration, in relation to a 5G NR wireless access, signaling flows similar to FIG. 7 involving other types of wireless networks and base stations will be readily apparent to those with ordinary skill in the art. In some embodiments, the UE 104 may be configured for UE based position determination or UE assisted positioning determination. FIG. 7 illustrates implementations for several different positioning methods that may be used separately or combined. For example, one or more of DL positioning methods TDOA and AOD may be performed, or combined UL and DL positioning methods, such as M-RTT may be performed. In the signaling flow 700, it is assumed that the UE 104 and location server 702 communicate using the LPP positioning protocol, although use of NPP or a combination of LPP and NPP or other future protocol, such as NRPPa, is also possible. Further, it should be understood that all messages and stages illustrated in FIG. 7 may not be transmitted or performed, and further, that FIG. 7 may not show all messages transmitted between entities in a positioning session. By way of example, and not limitation, in some implementations the positioning capabilities exchange in stages 1 and 2 may not be performed and/or the generation of assistance data and providing assistance data in stages 4 and 5 may not be performed.

At stage 1, the location server 702 sends a Request positioning capability message to the UE 104, e.g., to request the positioning capabilities from the UE 104.

At stage 2, the UE 104 returns a Provide Positioning Capabilities message to the location server 702 to provide the positioning capabilities of the UE 104. The UE 104, for example, may indicate its capabilities to perform different positioning measurements, as well as its capabilities with respect to, e.g., the maximum number of frequency layers, maximum number of TRPs, maximum number of PRS resource sets, maximum number of PRS resources, maximum bandwidth or different bandwidths, etc.

At stage 3, the location server 702, TRPs 102, target UE 104 and SL UE 104' may perform a positioning information and activation exchange. For example, the location server 702 may send an NRPPa positioning information request message to the TRP 102-1 and/or the SL UE 104' to request UL information for the UE 104, and the TRP 102-1 and/or SL UE 104' determines and provides the resources available to the location server 702 in a positioning information response message, and may provide the resources to the UE 104. The location server 702 may request UE UL PRS (e.g., SRS) and/or SL PRS activation from the serving TRP 102-1 and/or the SL UE 104', which activates the UE SRS and/or SL PRS transmissions from the UE 104. The location server 702 may further provide the TRPs 102 and/or SL UE 104' with configuration information for a plurality of PRS resources from the UE 104, e.g., UL PRS (SRS) to assist the TRPs 102 and/or SL UE 104' to acquire and measure the UL PRS (SRS) signals from the UE 104, which accordingly may be referred to herein as positioning assistance data. The location server 702 may provide a request for positioning information from the TRPs 102 and/or the SL UE 104'. The message, for example, may include all information required to enable the TRPs 102 and/or SL UE 104' to perform the PRS resource measurements. The location server 702 may send the TRPs 102 and/or SL UE 104' a message indicating a request to include in a location information report measurement information for PRS resources for position determination of the UE 104, and may indicate to prioritize the PRS resources for inclusion and/or ordering of the PRS resource measurements in the location information report based on measured multipath characteristics of the PRS resources.

At stage 4, the location server 702 may generate positioning assistance data for the UE 104 based, e.g., at least partially on the positioning capabilities of the UE 104. For example, as discussed above, the positioning assistance data may prioritize one or more of the frequency layers, TRPs, PRS resource sets and PRS resources. For example, the positioning assistance data may provide information regarding the frequency layers, TRPs, PRS resource sets, and PRS resources, such as an order of measurement or whether there is equal priority.

At stage 5, the location server 702 may send a provide assistance data message to the UE 104 to provide the positioning assistance data with configuration information for a plurality of PRS resources to assist the UE 104 to acquire and measure the DL PRS signals from TRPs 102 and/or the SL UE 104' and optionally to determine a location based on the PRS measurements received from the TRPs 102 and/or the SL UE 104'. The assistance data, for example, may include a set of common PRS assistance data, and separate sets of PRS assistance data per positioning method, which may index the common PRS assistance data.

At stage 6, the location server 702 may send a Request Location Information message to the UE 104 to request the UE 104 to measure DL PRS transmission by the TRPs 102, e.g., for DL positioning methods, such as TDOA, or AOD, and/or measure SL PRS transmissions from SL UE 104', and in some cases to transmit UL PRS, e.g., SRS to TRPs 102 or SL PRS to SL UE 104', for measurement in a combined DL and UL positioning method, such as M-RTT. The location server 702 may also indicate whether UE based positioning is requested whereby the UE 104 determines its own location, or UE assisted positioning. The message may indicate a request that the UE 104 is to include in a location information report measurement information for PRS resources; and may indicate that the UE is to prioritize the PRS resources for inclusion and/or ordering of the PRS resource measurements in the location information report based on measured multipath characteristics of the PRS resources. The message may indicate that the UE is to determine a subset of the plurality of the PRS resources to include in the location information report and/or to order in the location information report based on measured multipath characteristics of the PRS resources.

At stage 7A, the UE 104 may receive and measure DL PRS resources transmitted by the TRPs 102 and/or the SL PRS resources transmitted by the SL UE 104'. At stage 7B, the SL UE 104' may receive and measure SL PRS resources transmitted by the UE 104. At stage 7C, the TRPs 102 may receive and measure UL PRS (SRS) resources transmitted by the UE 104. It should be understood that not all of stages 7A, 7B, and 7C may be performed, and that only one of the stages or some combination of stages may be performed.

At stage 8A, the UE 104 measures the multipath characteristics of the DL PRS resources received from the TRPs 102 (if any) and/or the SL PRS resources transmitted by the SL UE 104' (if any). At stage 8B, the SL UE 104' measures the multipath characteristics of the SL PRS resources received from the UE 104 (if any). At stage 8C, the TRPs 102 measures the multipath characteristics of the UL PRS (SRS) resources received from the UE 104 (if any). Thus, a subset of a plurality of the PRS resources is determined to include and/or order in a location information report based on the measured multipath characteristics of the PRS resources. As discussed above, the multipath characteristics may be determined by determining the number of multipath components for each PRS resource, e.g., by determining a strength metric (such as SNR or relative RSRP) for each multipath component candidate for each PRS resource, and determining whether the multipath component candidates qualify as a multipath component by comparing the strength metric to a predetermined threshold to determine the number of multipath components. The measured multipath characteristics of the PRS resources may be the number of multipath components detected for the PRS resources, a strength metric of the multipath components detected for the PRS resources, the time domain span of multipath components detected for the PRS resources, or any combination thereof. The strength metric of the multipath components, for example, may be at least one of a relative power of each multipath components with respect to an earliest multipath component, a median power of the multipath components with respect to the power of the earliest multipath component, the median power of the multipath component with respect to a noise floor, or a combination thereof.

At stage 9A, the UE 104 may send a location information report to the location server 702 that may include the PRS measurements (and any other measurements) obtained at stage 8A. At stage 9B, the SL UE 104 may send a location information report to the location server 702 (or the UE 104 for UE based positioning as illustrated with dotted lines) that may include the PRS measurements (and any other measurements) obtained at stage 8B. At stage 9C, the TRPs 102 may send a location information report to the location server 702 (or the UE 104 for UE based positioning as illustrated with dotted lines) that may include the PRS measurements (and any other measurements) obtained at stage 8C. The location information reports include measurement information for the subset of the plurality of the PRS resources that was determined in stages 8A, 8B, and 8D based on the measured multipath characteristics of the PRS resources. Thus, the PRS resource measurements included in the location information report is based on the measured multipath characteristics of the associated PRS resources, e.g., if the number of multipath components detected is less than a threshold number, the strength metric of the multipath components detected for the PRS resources is greater than a threshold, the time domain span of multipath components detected for the PRS resources is less than a threshold, or any combination thereof. Moreover, the order of the PRS resource measurements in the location information report may be based on the measured multipath characteristics of the associated PRS resources. For example, the order of the measurement information for the PRS resources in the location information report may be based on number of multipath components of the PRS resources, the strength metric of the multipath components detected for the PRS resources, the time domain span of multipath components detected for the PRS resources, or any combination thereof. Additionally, the location information report may include the number of multipath components detected for each PRS resource.

At stage 10A, the location server 702 may determine the UE location based on the PRS resource measurements in the location information reports received at stages 9A, 9B, and 9C, for a UE assisted (or network assisted) positioning process. At stage 10B, the UE 104 may determine the UE location based on the PRS resource measurements from stage 7A and the PRS resource measurements received in the location information reports at stages 9B and 9C, for a UE based positioning process. The position estimate for the UE may be determined, e.g., using TDOA, AOD, AOA, M-RTT, etc. The position estimate for the UE may be determined based on the prioritization of the measurement information for the PRS resources, e.g., by weighting the measurement information based on the order measurement information for the PRS resources in the location information report(s), and determining the position estimated using the weighted measurement information for the PRS resources.

Figure 8:
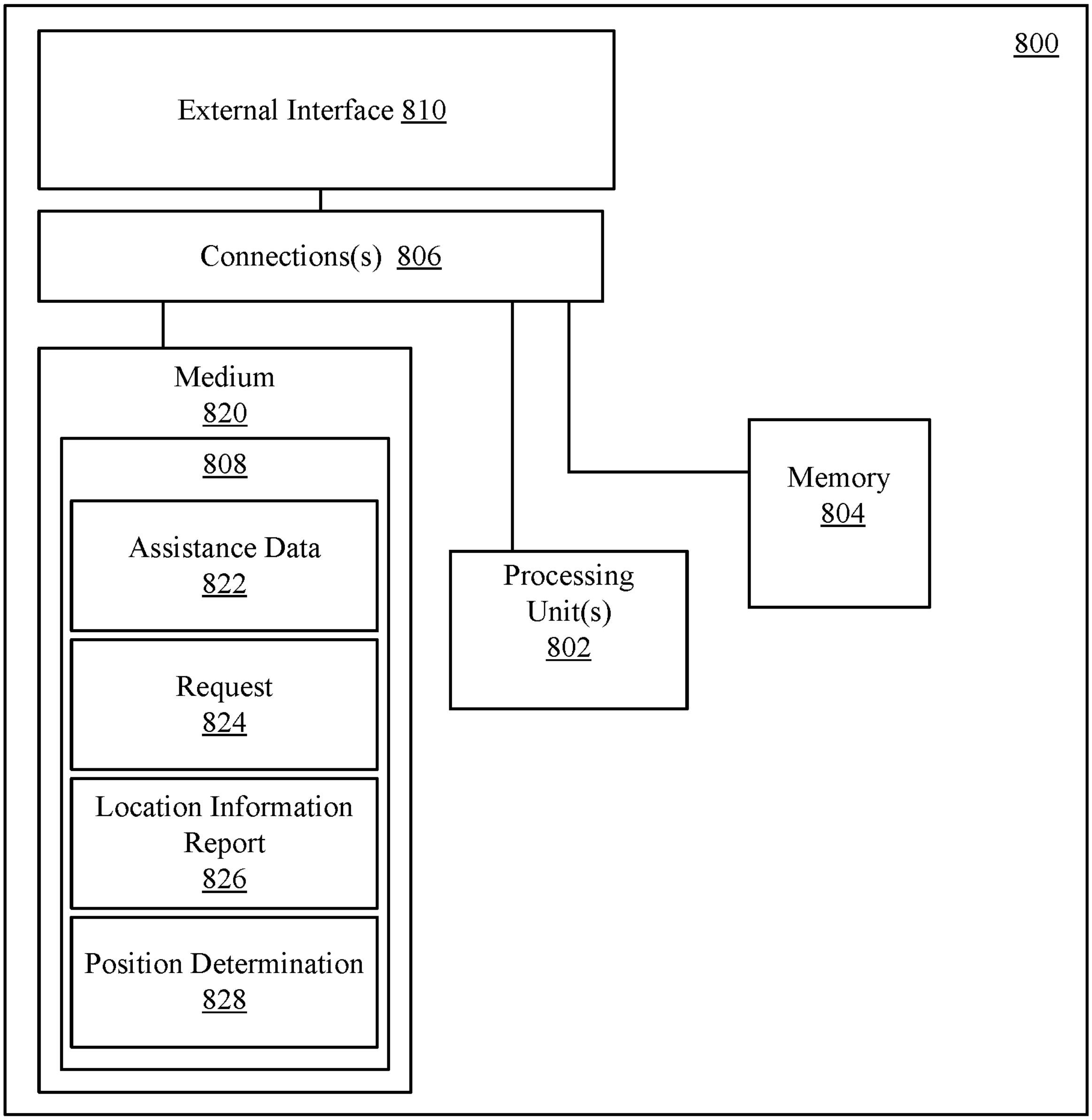
FIG. 8 is a schematic block diagram illustrating certain exemplary features of a location server enabled to support positioning of a UE using prioritization of PRS resource measurements based on multipath characteristics of the PRS resources for the location information report.

FIG. 8 shows a schematic block diagram illustrating certain exemplary features of a location server 800 in a wireless network enabled to support position determination of a UE including prioritization of PRS resource measurements based on multipath characteristics of the PRS resources for the location information report, as discussed herein. The location server 800 may be configured to perform the signaling flow 700 illustrated in FIG. 7, and the process 1000 illustrated in FIG. 10 along with other algorithms discussed herein. The location server 800, for example, may be the location server 172, location server 230*a*, 230*b* or LMF 270 in FIGS. 1, 2A, and 2B, or location server 702 in FIG. 7. The location server 800 may, for example, include one or more processors 802, memory 804, and an external interface, which may include an external interface 810 for communications (e.g., wireline or wireless network interface to other network entities and/or the core network), which may be operatively coupled with one or more connections 806 (e.g., buses, lines, fibers, links, etc.) to non-transitory computer readable medium 820 and memory 804. In some implementations, the location server 800 may further include additional items, which are not shown, such as a user interface that may include e.g., a display, a keypad or other input device, such as virtual keypad on the display, through which a user may interface with the network entity. In certain example implementations, all or part of location server 800 may take the form of a chipset, and/or the like. The external interface 810 may be a wired or wireless interface capable of connecting to other base stations, e.g., in the RAN or network entities, such as a location server 172 shown in FIG. 1A.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of location server 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in location server 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be utilized by the one or more processors 802 in order to manage both communications and the functionality described herein. It should be appreciated that the organization of the contents of the medium 820 and/or memory 804 as shown in location server 800 is merely exemplary, and as such the functionality of the modules and/or data structures may be combined, separated, and/or be structured in different ways depending upon the implementation of the location server 800.

The medium 820 and/or memory 804 may include an assistance data module 822 that when implemented by the one or more processors 802 configures the one or more processors 802 to prepare and send, via external interface 810, positioning assistance data for the UE to a network node, such as the target UE 104, a SL UE 104', or base stations 102. The assistance data includes confirmation information for a number of PRS resources for the network node to measure.

The medium 820 and/or memory 804 may include a request module 824 that when implemented by the one or more processors 802 configures the one or more processors 802 to send, via the external interface 810, a message to the network node that indicates a request for the network node indicating that the network node is to determine a subset of the plurality of the PRS resources for which measurement information is to be included in a location information report based on measured multipath characteristics of the PRS resources. The request, for example, may be a request for a location information report for position determination of the UE, e.g., sent to the UE, or aa request for positioning information, e.g., sent to TRPs and/or one or more SL UEs. For example, the request may indicate that the network node is to prioritize, e.g., include and/or order, PRS resource measurements in the location information report based on the measured multipath characteristics of the PRS resources. The request may include information necessary for prioritization, such as thresholds to be used for selecting the subset of the plurality of the PRS resources based on measured multipath characteristics of the PRS resources.

The medium 820 and/or memory 804 may include a location information report module 826 that when implemented by the one or more processors 802 configures the one or more processors 802 to receive, via the external interface 810, a location information report from the network node. The location information report includes the measurement information for the subset of the plurality of the PRS resources based on the measured multipath characteristics of the PRS resources. The one or more processors 802 may be configured to receive the ordered measurement information in the location information report, wherein the order is based on the measured multipath characteristics of the PRS resources. The one or more processors 802 may be configured to receive the number of multipath components detected for each PRS resource in the location information report.

The medium 820 and/or memory 804 may include a position determination module 828 that when implemented by the one or more processors 802 configures the one or more processors 802 to determine a position estimate for the UE based on the measurement information in the location information report received from the network node, e.g., using TDOA, AOA, AOD, M-RTT, etc. The one or more processors 802 may be configured to weight the measurement information for the PRS resources according to the order of the measurement information for the PRS resources in the location information report and to determine the position estimate based on weighted measurement information for the PRS resources.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a program code 808. For example, the non-transitory computer readable medium including program code 808 stored thereon may include program code 808 to support position determination of a UE including prioritization of PRS resource measurements based on multipath characteristics of the PRS resources for the location information report, in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus.

For example, a communication apparatus may include an external interface 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random-access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable program code 808 stored thereon, which if executed by one or more processors 802 may be operatively enabled to perform all or portions of the example operations as described herein. Computer readable medium 820 may be a part of memory 804.

Figure 9:
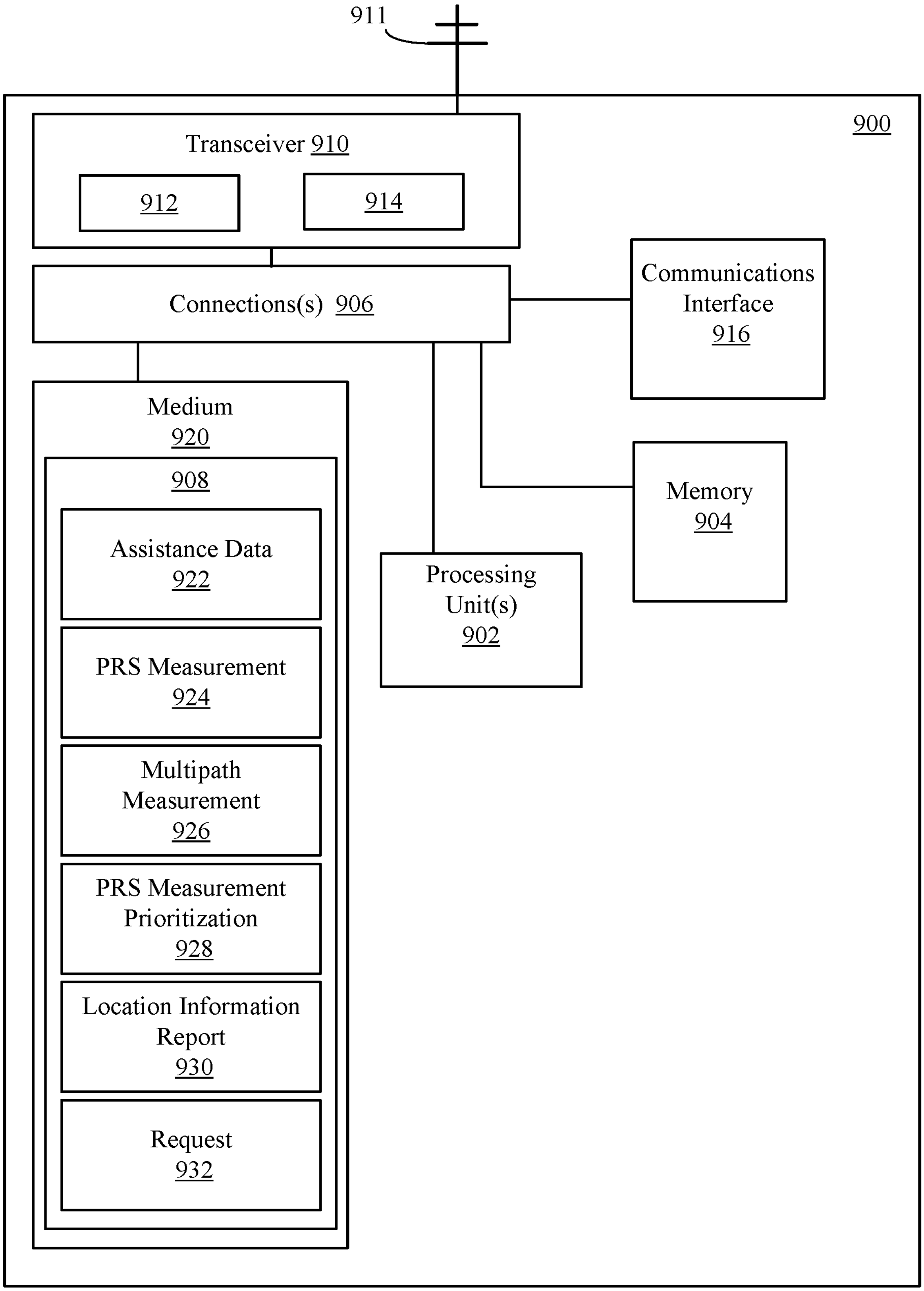
FIG. 9 is a schematic block diagram illustrating certain exemplary features of a network node enabled to support positioning using prioritization of PRS resource measurements based on multipath characteristics of the PRS resources for the location information report.

FIG. 9 shows a schematic block diagram illustrating certain exemplary features of a network node 900, e.g., which may be the UE 104, SL UE 104', or a base station (TRP) 102, shown in FIGS. 1 and 7, enabled to support position measurement determination of a UE including prioritization of PRS resource measurements based on multipath characteristics of the PRS resources for the location information report, as discussed herein. The network node may be configured to perform the signaling flow 700 illustrated in FIG. 7, and the process 1100 illustrated in FIG. 11 along with other algorithms discussed herein. The network node 900 may, for example, include one or more processors 902, memory 904, and an external interface, which may include a wireless transceiver 910 (e.g., wireless network interface) and may further include a communications interface 916 (e.g., a wired or wireless network interface) to communicate with the core network if the network node 900 is a base station, which may be operatively coupled with one or more connections 906 (e.g., buses, lines, fibers, links, etc.) to non-transitory computer readable medium 920 and memory 904. The network node 900 may further include additional items, which are not shown, such as a user interface that may include e.g., a display, a keypad or other input device, such as virtual keypad on the display, through which a user may interface with the network node, or a satellite positioning system receiver. In certain example implementations, all or part of network node 900 may take the form of a chipset, and/or the like. Wireless transceiver 910 may, for example, include a transmitter 912 enabled to transmit one or more signals over one or more types of wireless communication networks and a receiver 914 to receive one or more signals transmitted over the one or more types of wireless communication networks.

In some embodiments, network node 900 may include antenna 911, which may be internal or external. The antenna 911 may be used to transmit and/or receive signals processed by wireless transceiver 910. In some embodiments, antenna 911 may be coupled to wireless transceiver 910. In some embodiments, measurements of signals received (transmitted) by network node 900 may be performed at the point of connection of the antenna 911 and wireless transceiver 910. For example, the measurement point of reference for received (transmitted) RF signal measurements may be an input (output) terminal of the receiver 914 (transmitter 912) and an output (input) terminal of the antenna 911. In a network node 900 with multiple antennas 911 or antenna arrays, the antenna connector may be viewed as a virtual point representing the aggregate output (input) of multiple network node antennas. network node 900 may receive PRS signals, e.g., DL PRS, and/or SL PRS if the network node 900 is a UE, or UL PRS (SRS) if the network node 900 is a base station. Measurements of signals, including one or more of timing measurements, such RSTD, Rx-Tx, TOA, TDOA, AOD, M-RTT, etc., energy measurements, such as RSRP, quality metrics, velocity and/or trajectory measurements, reference TRP, multipath information, line of sight (LOS) or non-line of sight (NLOS) factors, signal to interference noise ratio (SINR), and time stamps may be processed by the one or more processors 902.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of network node 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in network node 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in network node 900 is merely exemplary, and as such the functionality of the modules and/or data structures may be combined, separated, and/or be structured in different ways depending upon the implementation of the network node 900.

The medium 920 and/or memory 904 may include an assistance data module 922 that when implemented by the one or more processors 902 configures the one or more processors 902 to receive, via the external interface comprising at least one of the wireless transceiver 910 or the communications interface 916, positioning assistance data for the UE from a location server. The assistance data includes confirmation information for a plurality of PRS resources for the network node to measure. For example, if the network node 900 is the target UE the PRS resources may be at least one of downlink PRS received from one or more base stations or sidelink PRS received from one or more sidelink UEs. If the network node 900 is a base station, the PRS resources may be UL PRS, e.g., sounding reference signals, received from the UE. If the network node 900 is a sidelink UE, the PRS resources may be sidelink PRS received from the UE.

The medium 920 and/or memory 904 may include a PRS measurement module 924 that when implemented by the one or more processors 902 configures the one or more processors 902 to obtain measurement information for the PRS resources received from other entities in the wireless network. For example, the one or more processors 902 may be configured to receive, via the wireless transceiver 910, PRS resources from other entities (e.g., base station, SL UE, or target UE) and to determine PRS resource measurements. The positioning measurements may be for one or more positioning methods, such as TDOA, AOD, AOA, multi-RTT, methods, etc. By way of example, the one or more processors 902 may be configured for positioning measurements including one or more of, timing measurements such as RSTD, Rx-Tx, TOA, etc., energy measurements such as RSRP, quality metrics, velocity and/or trajectory measurements, reference TRP, multipath information, LOS/NLOS factors, SINR, and time stamps.

The medium 920 and/or memory 904 may include a multipath measurement module 926 that when implemented by the one or more processors 902 configures the one or more processors 902 to measures multipath characteristics of the PRS resources. For example, the one or more processors 902 may be configured to determine the number of multipath components for each PRS resource by determining a strength metric for each multipath component candidate for each PRS resource; and determining the number of multipath components for each PRS resource based on the strength metric for each multipath component candidate for each PRS resource. For example, the strength metric may be compared to a threshold to determine of the multipath component candidate qualifies as a multipath component. The multipath characteristics of the PRS resources determined by the one or more processors 902 may be the number of multipath components detected for the PRS resources. The one or more processors 902 may be configured to determine a strength metric for the multipath components for each PRS resource. The strength metric of the multipath components detected for each PRS resource may be at least one of a relative power of each multipath components with respect to an earliest multipath component, a median power of the multipath components with respect to a power of the earliest multipath component, the median power of the multipath components with respect to a noise floor, or a combination thereof. The one or more processors 902 may be configured to determine a time domain span of multipath components detected for the PRS resources.

The medium 920 and/or memory 904 may include a PRS measurement prioritization module 928 that when implemented by the one or more processors 902 configures the one or more processors 902 to determine a subset of the plurality of the PRS resources to include in a location information report based on the multipath characteristics of the PRS resources. The one or more processors 902 may be configured, for example, to determine to include PRS resource measurements in the location information report based on the number of detected multipath components, e.g., if the number of multipath components detected is less than a threshold number, the strength metric of the multipath components detected for the PRS resources, the time domain span of multipath components detected for the PRS resources, or a combination thereof. The one or more processors 902 may be configured to order the PRS resource measurements in the location information based on the multipath characteristics of the PRS resources, such as the number of multipath components detected, the strength metric of the multipath components detected for the PRS resources, the time domain span of multipath components detected for the PRS resources, or a combination thereof.

The medium 920 and/or memory 904 may include a location information report module 930 that when implemented by the one or more processors 902 configures the one or more processors 902 to send, via the external interface comprising at least one of the transceiver 910 or communications interface 916, the location information report to the location server with the measurement information for the subset of the plurality of the PRS resources based on the multipath characteristics of the PRS resources. The one or more processors 902 may be configured to order the measurement information for the PRS resources in the location information report may be based on the multipath characteristics of the PRS resources. The one or more processors 902 may be configured to include a number of multipath components detected for each PRS resource.

The medium 920 and/or memory 904 may include a request module 932 that when implemented by the one or more processors 902 configures the one or more processors 902 to receive, via the external interface comprising at least one of the transceiver 910 or communications interface 916, a request from the location server indicating that the UE is to determine the subset of the plurality of the PRS resources for which the measurement information is to be included in the location information report based on the measured multipath characteristics of the PRS resources. The request, for example, may be part of a request for a location information report.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a program code 908. For example, the non-transitory computer readable medium including program code 908 stored thereon may include program code 908 to support position measurement determination of a UE including prioritization of reporting PRS resource measurements based on multipath characteristics of the PRS resources, in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable program code 908 stored thereon, which if executed by one or more processors 902 may be operatively enabled to perform all or portions of the example operations as described herein. Computer readable medium 920 may be a part of memory 904.

Figure 10:
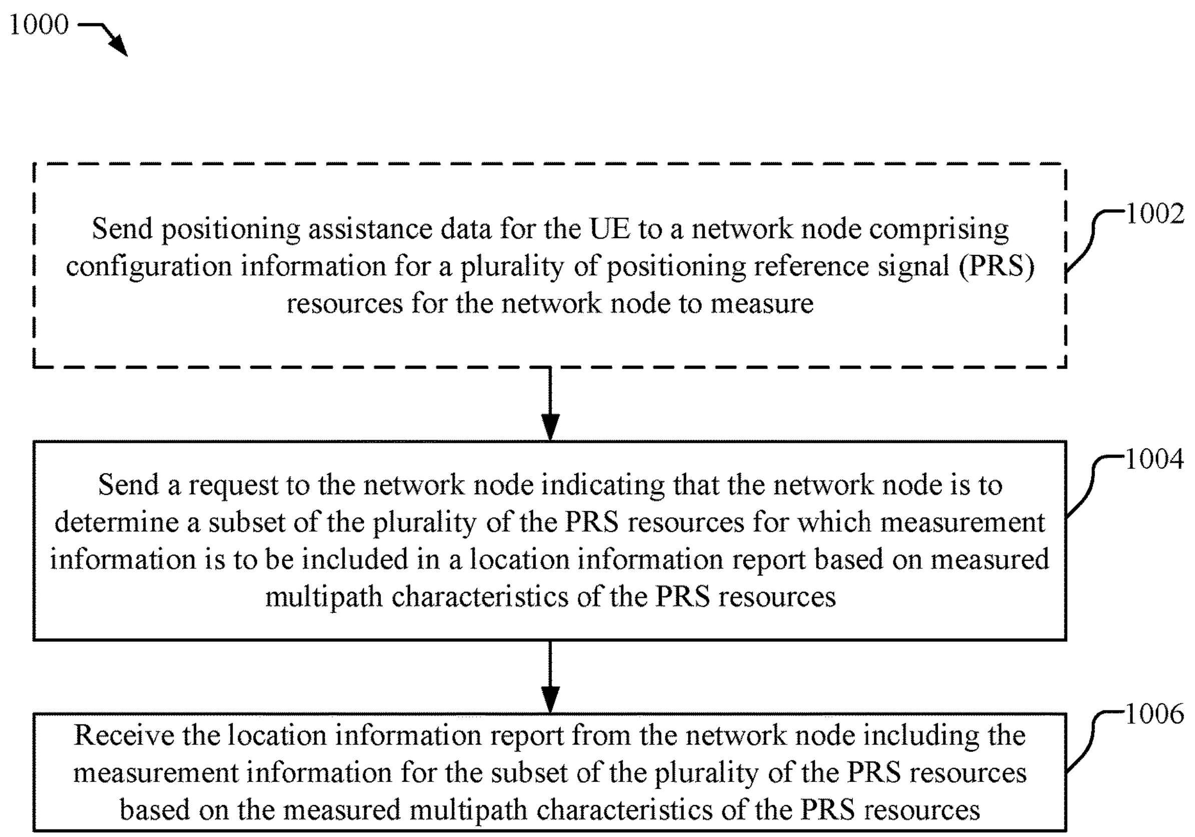
FIG. 10 shows a flowchart for an exemplary process for position determination of a UE performed by the location server in a wireless network wireless using prioritization of PRS resource measurements based on multipath characteristics of the PRS resources for the location information report.

FIG. 10 shows a flowchart for an exemplary process 1000 for position determination of a user equipment (e.g. a target UE 104), performed by a location server, such as location server 800 shown in FIG. 8, in a manner consistent with the implementations disclosed herein.

At block 1002, the location server sends positioning assistance data for the UE to a network node comprising configuration information for a plurality of positioning reference signal (PRS) resources for the network node to measure, e.g., as discussed in stages 3 and 5 of FIG. 7. By way of example, the network node may be the target UE, such as UE 104, and the PRS resources may be at least one of downlink PRS transmitted by a base station, such as base stations 102, or sidelink PRS transmitted by a sidelink UE, such as UE 104'. The network node may be a base station, such as base station 102, and the PRS resources may be UL PRS, e.g., sounding reference signals, transmitted by the UE. The network node may be a sidelink UE, such as UE 104', and the PRS resources may be sidelink PRS transmitted by the UE. A means for sending positioning assistance data for the UE to a network node comprising configuration information for a plurality of positioning reference signal (PRS) resources for the network node to measure may include, e.g., the external interface 810 and one or more processors 802 with dedicated hardware or implementing executable code or software instructions in memory 804 and/or medium 820, such as the assistance data module 822, in the location server 800 shown in FIG. 8. In some implementation, as indicated by the dotted lines of block 1002, block 1002 may not be performed, i.e.., positioning assistance data may not be sent by the location server.

At block 1004, the location server may send a request to the network node indicating that the network node is to determine a subset of the plurality of the PRS resources for which measurement information is to be included in a location information report based on measured multipath characteristics of the PRS resources, e.g., as discussed in stages 3 and 6 of FIG. 7. For example, in some implementations, the request to the network node may be a request for a location information report for position determination of the UE. A means for sending a request to the network node indicating that the network node is to determine a subset of the plurality of the PRS resources for which measurement information is to be included in a location information report based on measured multipath characteristics of the PRS resources may include, e.g., the external interface 810 and one or more processors 802 with dedicated hardware or implementing executable code or software instructions in memory 804 and/or medium 820, such as the request module 824, in the location server 800 shown in FIG. 8.

At block 1006, the location server may receive the location information report from the network node with the measurement information for the subset of the plurality of the PRS resources based on the measured multipath characteristics of the PRS resources, e.g., as discussed in stages 9A, 9B, and 9C of FIG. 7. In some implementations, an order of the measurement information for the subset of the plurality of the PRS resources in the location information report may be based on the measured multipath characteristics of the PRS resources, e.g., as discussed in stages 9A, 9B, and 9C of FIG. 7. In some implementations, the location information report from the network node with the measurement information for the subset of the plurality of the PRS resources may include a number of multipath components detected for each PRS resource, e.g., as discussed in stages 9A, 9B, and 9C of FIG. 7. A means for receiving the location information report from the network node with the measurement information for the subset of the plurality of the PRS resources based on the measured multipath characteristics of the PRS resources may include, e.g., the external interface 810 and one or more processors 802 with dedicated hardware or implementing executable code or software instructions in memory 804 and/or medium 820, such as the location information report module 826, in the location server 800 shown in FIG. 8.

In some implementations, the location server may determine a position estimate for the UE based on the measurement information in the location information report received from the network node, e.g., as discussed in stage 10A of FIG. 7. A means for determining a position estimate for the UE based on the measurement information in the location information report received from the network node may include, e.g., the one or more processors 802 with dedicated hardware or implementing executable code or software instructions in memory 804 and/or medium 820, such as the position determination module 828, in the location server 800 shown in FIG. 8. By way of example, the location may determine the position estimate for the UE based on the measurement information in the location information report by weighting the measurement information for the PRS resources according to an order of the measurement information for the PRS resources in the location information report, and determining the position estimate based on weighted measurement information for the PRS resources, e.g., as discussed at stage 10A of FIG. 7. A means for weighting the measurement information for the PRS resources according to an order of the measurement information for the PRS resources in the location information report, and a means for determining the position estimate based on weighted measurement information for the PRS resources may include, e.g., the one or more processors 802 with dedicated hardware or implementing executable code or software instructions in memory 804 and/or medium 820, such as the position determination module 828, in the location server 800 shown in FIG. 8.

In some implementations, the measured multipath characteristics of the PRS resources may be a number of multipath components detected for the PRS resources, e.g., as discussed in stages 8A, 8B, and 8C of FIG. 7. For example, the measurement information for each PRS resource may be included in the location information report only if the number of multipath components detected is less than a threshold number.

In some implementations, the measured multipath characteristics of the PRS resources may be a strength metric of multipath components detected for the PRS resources, e.g., as discussed in stages 8A, 8B, and 8C of FIG. 7. For example, an order of the measurement information for the subset of the plurality of the PRS resources in the location information report may be based on the strength metric of the multipath components detected for the PRS resources. The strength metric of the multipath components detected for each PRS resource may be at least one of a relative power of each multipath components with respect to an earliest multipath component, a median power of the multipath components with respect to a power of the earliest multipath component, the median power of the multipath components with respect to a noise floor, or a combination thereof, e.g., as discussed in stages 8A, 8B, and 8C of FIG. 7.

In some implementations, the measured multipath characteristics of the PRS resources may be a time domain span of multipath components detected for the PRS resources, e.g., as discussed in stages 8A, 8B, and 8C of FIG. 7.

Figure 11:
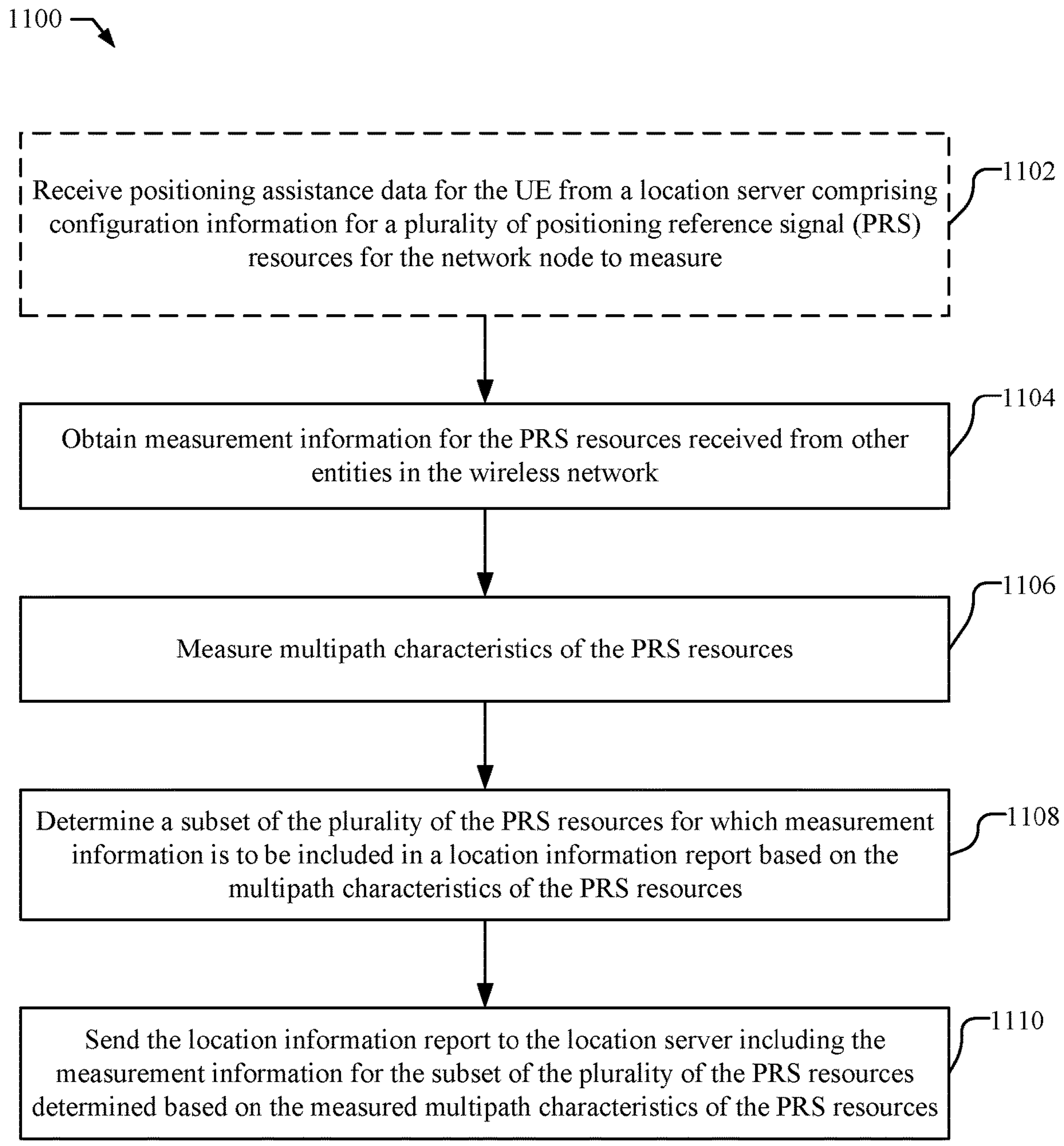
FIG. 11 shows a flowchart for an exemplary process for position measurement determination for a UE performed by a network node in a wireless network wireless using prioritization of PRS resource measurements based on multipath characteristics of the PRS resources for the location information report.

FIG. 11 shows a flowchart for an exemplary process 1100 for position measurement determination for a user equipment (e.g. a target UE 104), performed by a network node in a wireless network, such as network node 900 shown in FIG. 9, in a manner consistent with the implementations disclosed herein.

At block 1102, the network node receives positioning assistance data for the UE from a location server including configuration information for a plurality of positioning reference signal (PRS) resources for the network node to measure, e.g., as discussed at stages 3 and 5 of FIG. 7. By way of example, the network node may be the target UE, such as UE 104, and the PRS resources may be at least one of downlink PRS received from one or more base stations, such as base stations 102, or sidelink PRS received from one or more sidelink UEs, such as UE 104'. The network node may be a base station, such as base station 102, and the PRS resources may be UL PRS, e.g., sounding reference signals, received from the UE. The network node may be a sidelink UE, such as UE 104', and the PRS resources may be sidelink PRS received from the UE. A means for receiving positioning assistance data for the UE from a location server comprising configuration information for a plurality of positioning reference signal (PRS) resources for the network node to measure may include, e.g., the external interface, e.g., including at least one of a wireless transceiver 910 or communications interface 916, and one or more processors 902 with dedicated hardware or implementing executable code or software instructions in memory 904 and/or medium 920, such as the assistance data module 922, in the network node 900 shown in FIG. 9. In some implementation, as indicated by the dotted lines of block 1102, block 1102 may not be performed, i.e.., positioning assistance data may not be received by the network node.

At block 1104, the network node obtains measurement information for the PRS resources received from other entities in the wireless network, e.g., as discussed at stages 7A, 7B, and 7C of FIG. 7. A means for obtaining measurement information for the PRS resources received from other entities in the wireless network may include, e.g., the wireless transceiver 910 and one or more processors 902 with dedicated hardware or implementing executable code or software instructions in memory 904 and/or medium 920, such as the PRS measurement module 924, in the network node 900 shown in FIG. 9.

At block 1106, the network node measures multipath characteristics of the PRS resources, e.g., as discussed at stages 8A, 8B, and 8C in FIG. 7. A means for measuring multipath characteristics of the PRS resources may include, e.g., the one or more processors 902 with dedicated hardware or implementing executable code or software instructions in memory 904 and/or medium 920, such as the multipath measurement module 926, in the network node 900 shown in FIG. 9.

At block 1108, the network node determines a subset of the plurality of the PRS resources for which measurement information is to be included in a location information report based on measured multipath characteristics of the PRS resources, e.g., as discussed at stages 8A, 8B, and 8C in FIG. 7. A means for determining a subset of the plurality of the PRS resources for which measurement information is to be included in a location information report based on measured multipath characteristics of the PRS resources may include, e.g., the one or more processors 902 with dedicated hardware or implementing executable code or software instructions in memory 904 and/or medium 920, such as the PRS measurement prioritization module 928, in the network node 900 shown in FIG. 9.

At block 1110, the network node sends the location information report to the location server including the measurement information for the subset of the plurality of the PRS resources determined based on the measured multipath characteristics of the PRS resources, e.g., as discussed at stages 9A, 9B, and 9C of FIG. 7. In some implementations, an order of the measurement information for the subset of the plurality of the PRS resources in the location information report is based on the measured multipath characteristics of the PRS resources, e.g., as discussed at stages 9A, 9B, and 9C of FIG. 7. A means for sending the location information report to the location server with the measurement information for the subset of the plurality of the PRS resources based on the multipath characteristics of the PRS resources may include, e.g., the external interface, including at least one of a wireless transceiver 910 or communications interface 916, and one or more processors 902 with dedicated hardware or implementing executable code or software instructions in memory 904 and/or medium 920, such as the location information report module 930, in the network node 900 shown in FIG. 9. In some implementations, network node may include a number of multipath components detected for each PRS resource in the location information report, e.g., as discussed at stages 9A, 9B, and 9C of FIG. 7. A means for including a number of multipath components detected for each PRS resource in the location information report may include, e.g., the wireless transceiver 910 and one or more processors 902 with dedicated hardware or implementing executable code or software instructions in memory 904 and/or medium 920, such as the location information report module 930, in the network node 900 shown in FIG. 9.

In some implementations, the network node may receive a request from the location server indicating that the UE is to determine the subset of the plurality of the PRS resources for which the measurement information is to be included in the location information report based on the measured multipath characteristics of the PRS resources, e.g., as discussed at stages 3 and 6 of FIG. 7. For example, in some implementations, the request may be a request for a location information report for position determination of the UE. A means for receiving a request from the location server indicating that the UE is to determine the subset of the plurality of the PRS resources for which the measurement information is to be included in the location information report based on the measured multipath characteristics of the PRS resources may include, e.g., the wireless transceiver 910 and one or more processors 902 with dedicated hardware or implementing executable code or software instructions in memory 904 and/or medium 920, such as the request module 932, in the network node 900 shown in FIG. 9.

In some implementations, the network node may measure multipath characteristics of the PRS resources by determining a number of multipath components for each PRS resource, e.g., as discussed in stages 8A, 8B, and 8C of FIG. 7. A means for determining a number of multipath components for each PRS resource may include, e.g., the wireless transceiver 910 and one or more processors 902 with dedicated hardware or implementing executable code or software instructions in memory 904 and/or medium 920, such as the multipath measurement module 926, in the network node 900 shown in FIG. 9. For example, the network node may determine the number of multipath components for each PRS resource by determining a strength metric for each multipath component candidate for each PRS resource; and determining the number of multipath components for each PRS resource based on the strength metric for each multipath component candidate for each PRS resource, e.g., as discussed in stages 8A, 8B, and 8C of FIG. 7. A means for determining a strength metric for each multipath component candidate for each PRS resource; and a means for determining the number of multipath components for each PRS resource based on the strength metric for each multipath component candidate for each PRS resource may include, e.g., the wireless transceiver 910 and one or more processors 902 with dedicated hardware or implementing executable code or software instructions in memory 904 and/or medium 920, such as the multipath measurement module 926, in the network node 900 shown in FIG. 9.

In some implementations, the measured multipath characteristics of the PRS resources may be a number of multipath components detected for the PRS resources, e.g., as discussed at stages 8A, 8B, and 8C of FIG. 7. For example, the measurement information for each PRS resource may be included in the location information report only if the number of multipath components detected is less than a threshold number, e.g., as discussed at stages 8A, 8B, and 8C of FIG. 7.

In some implementations, the measured multipath characteristics of the PRS resources may be a strength metric of multipath components detected for the subset of the plurality of the PRS resources, e.g., as discussed at stages 8A, 8B, and 8C of FIG. 7. For example, an order of the measurement information for the PRS resources in the location information report may be based on the strength metric of the multipath components detected for the PRS resources, e.g., as discussed at stages 9A, 9B, and 9C of FIG. 7. The strength metric of the multipath components detected for each PRS resource may be at least one of a relative power of each multipath components with respect to an earliest multipath component, a median power of the multipath components with respect to a power of the earliest multipath component, the median power of the multipath components with respect to a noise floor, or a combination thereof, e.g., as discussed at stages 8A, 8B, and 8C of FIG. 7.

In some implementations, the measured multipath characteristics of the PRS resources may be a time domain span of multipath components detected for the PRS resources, e.g., as discussed at stages 8A, 8B, and 8C of FIG. 7.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

In view of this description embodiments may include different combinations of features. Implementation examples are described in the following numbered clauses:

Clause 1. A method performed by a location server in a wireless network for position determination of a user equipment (UE) in the wireless network, comprising: sending positioning assistance data for the UE to a network node comprising configuration information for a plurality of positioning reference signal (PRS) resources for the network node to measure; sending a request to the network node indicating that the network node is to determine a subset of the plurality of the PRS resources for which measurement information is to be included in a location information report based on measured multipath characteristics of the PRS resources; receiving the location information report from the network node including the measurement information for the subset of the plurality of the PRS resources based on the measured multipath characteristics of the PRS resources.

Clause 2. The method of clause 1, wherein the request to the network node is a request for a location information report for position determination of the UE.

Clause 3. The method of clause 1, further comprising determining a position estimate for the UE based on the measurement information in the location information report received from the network node.

Clause 4. The method of clause 3, wherein determining the position estimate for the UE based on the measurement information in the location information report comprises: weighting the measurement information for the PRS resources according to an order of the measurement information for the PRS resources in the location information report; and determining the position estimate based on weighted measurement information for the PRS resources.

Clause 5. The method of any of clauses 1-4, wherein the network node is the UE and the PRS resources comprise at least one of downlink PRS transmitted by a base station or sidelink PRS transmitted by a sidelink UE.

Clause 6. The method any of clauses 1-4, wherein the network node is a base station and the PRS resources comprise sounding reference signals transmitted by the UE.

Clause 7. The method of any of clauses 1-4, wherein the network node is a sidelink UE and the PRS resources comprise sidelink PRS transmitted by the UE.

Clause 8. The method of any of clauses 1-7, wherein an order of the measurement information for the subset of the plurality of the PRS resources in the location information report is based on the measured multipath characteristics of the PRS resources.

Clause 9. The method of any of clauses 1-8, wherein the measured multipath characteristics of the PRS resources comprises a number of multipath components detected for the PRS resources.

Clause 10. The method of clause 9, wherein the measurement information for each PRS resource is included in the location information report only if the number of multipath components detected is less than a threshold number.

Clause 11. The method of any of clauses 1-10, wherein the measured multipath characteristics of the PRS resources comprises a strength metric of multipath components detected for the PRS resources.

Clause 12. The method of clause 11, wherein an order of the measurement information for the subset of the plurality of the PRS resources in the location information report is based on the strength metric of the multipath components detected for the PRS resources.

Clause 13. The method of any of clauses 11-12, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 14. The method of any of clauses 1-13, wherein the measured multipath characteristics of the PRS resources comprises a time domain span of multipath components detected for the PRS resources.

Clause 15. The method of any of clauses 1-14, wherein the location information report from the network node with the measurement information for the subset of the plurality of the PRS resources comprises a number of multipath components detected for each PRS resource.

Clause 16. A location server in a wireless network configured for position determination of a user equipment (UE) in the wireless network, comprising: an external interface configured to communicate with entities in the wireless network; at least one memory; at least one processor coupled to the external interface and the at least one memory, wherein the at least one processor is configured to: send, via the external interface, positioning assistance data for the UE to a network node comprising configuration information for a plurality of positioning reference signal (PRS) resources for the network node to measure; send, via the external interface, a request to the network node indicating that the network node is to determine a subset of the plurality of the PRS resources for which measurement information is to be included in a location information report based on measured multipath characteristics of the PRS resources; receive, via the external interface, the location information report from the network node including the measurement information for the subset of the plurality of the PRS resources based on the measured multipath characteristics of the PRS resources.

Clause 17. The location server of clause 16, wherein the request to the network node is a request for a location information report for position determination of the UE.

Clause 18. The location server of clause 16, wherein the at least one processor is further configured to determine a position estimate for the UE based on the measurement information in the location information report received from the network node.

Clause 19. The location server of clause 18, wherein the at least one processor is configured to determine the position estimate for the UE based on the measurement information in the location information report by being configured to: weight the measurement information for the PRS resources according to an order of the measurement information for the PRS resources in the location information report; and determine the position estimate based on weighted measurement information for the PRS resources.

Clause 20. The location server of any of clauses 16-19, wherein the network node is the UE and the PRS resources comprise at least one of downlink PRS transmitted by a base station or sidelink PRS transmitted by a sidelink UE.

Clause 21. The location server of any of clauses 16-19, wherein the network node is a base station and the PRS resources comprise sounding reference signals transmitted by the UE.

Clause 22. The location server of any of clauses 16-19, wherein the network node is a sidelink UE and the PRS resources comprise sidelink PRS transmitted by the UE.

Clause 23. The location server of any of clauses 16-22, wherein an order of the measurement information for the subset of the plurality of the PRS resources in the location information report is based on the measured multipath characteristics of the PRS resources.

Clause 24. The location server of any of clauses 16-23, wherein the measured multipath characteristics of the PRS resources comprises a number of multipath components detected for the PRS resources.

Clause 25. The location server of clause 24, wherein the measurement information for each PRS resource is included in the location information report only if the number of multipath components detected is less than a threshold number.

Clause 26. The location server of any of clauses 16-25, wherein the measured multipath characteristics of the PRS resources comprises a strength metric of multipath components detected for the PRS resources.

Clause 27. The location server of clause 26, wherein an order of the measurement information for the subset of the plurality of the PRS resources in the location information report is based on the strength metric of the multipath components detected for the PRS resources.

Clause 28. The location server of any of clauses 26-27, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 29. The location server of any of clauses 16-28, wherein the measured multipath characteristics of the PRS resources comprises a time domain span of multipath components detected for the PRS resources.

Clause 30. The location server of any of clauses 16-29, wherein the location information report from the network node with the measurement information for the subset of the plurality of the PRS resources comprises a number of multipath components detected for each PRS resource.

Clause 31. A location server in a wireless network configured for position determination of a user equipment (UE) in the wireless network, comprising: means for sending positioning assistance data for the UE to a network node comprising configuration information for a plurality of positioning reference signal (PRS) resources for the network node to measure; means for sending a request to the network node indicating that the network node is to determine a subset of the plurality of the PRS resources for which measurement information is to be included in a location information report based on measured multipath characteristics of the PRS resources; means for receiving the location information report from the network node including the measurement information for the subset of the plurality of the PRS resources based on the measured multipath characteristics of the PRS resources.

Clause 32. The location server of clause 31, wherein the request to the network node is a request for a location information report for position determination of the UE.

Clause 33. The location server of clause 31, further comprising means for determining a position estimate for the UE based on the measurement information in the location information report received from the network node.

Clause 34. The location server of clause 33, wherein the means for determining the position estimate for the UE based on the measurement information in the location information report comprises: means for weighting the measurement information for the PRS resources according to an order of the measurement information for the PRS resources in the location information report; and means for determining the position estimate based on weighted measurement information for the PRS resources.

Clause 35. The location server of any of clauses 31-34, wherein the network node is the UE and the PRS resources comprise at least one of downlink PRS transmitted by a base station or sidelink PRS transmitted by a sidelink UE.

Clause 36. The location server of any of clauses 31-34, wherein the network node is a base station and the PRS resources comprise sounding reference signals transmitted by the UE.

Clause 37. The location server of any of clauses 31-34, wherein the network node is a sidelink UE and the PRS resources comprise sidelink PRS transmitted by the UE.

Clause 38. The location server of any of clauses 31-37, wherein an order of the measurement information for the subset of the plurality of the PRS resources in the location information report is based on the measured multipath characteristics of the PRS resources.

Clause 39. The location server of any of clauses 31-38, wherein the measured multipath characteristics of the PRS resources comprises a number of multipath components detected for the PRS resources.

Clause 40. The location server of clause 39, wherein the measurement information for each PRS resource is included in the location information report only if the number of multipath components detected is less than a threshold number.

Clause 41. The location server of any of clauses 31-40, wherein the measured multipath characteristics of the PRS resources comprises a strength metric of multipath components detected for the PRS resources.

Clause 42. The location server of clause 41, wherein an order of the measurement information for the subset of the plurality of the PRS resources in the location information report is based on the strength metric of the multipath components detected for the PRS resources.

Clause 43. The location server of any of clauses 41-42, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 44. The location server of any of clauses 31-43, wherein the measured multipath characteristics of the PRS resources comprises a time domain span of multipath components detected for the PRS resources.

Clause 45. The location server of any of clauses 31-44, wherein the location information report from the network node with the measurement information for the subset of the plurality of the PRS resources comprises a number of multipath components detected for each PRS resource.

Clause 46. A non-transitory storage medium including program code stored thereon, the program code is operable to configure at least one processor in a location server in a wireless network for position determination of a user equipment (UE) in the wireless network, the program code comprising instructions to: send positioning assistance data for the UE to a network node comprising configuration information for a plurality of positioning reference signal (PRS) resources for the network node to measure; send a request to the network node indicating that the network node is to determine a subset of the plurality of the PRS resources for which measurement information is to be included in a location information report based on measured multipath characteristics of the PRS resources; receive the location information report from the network node including the measurement information for the subset of the plurality of the PRS resources based on the measured multipath characteristics of the PRS resources.

Clause 47. The non-transitory storage medium of clause 46, wherein the request to the network node is a request for a location information report for position determination of the UE.

Clause 48. The non-transitory storage medium of clause 46, wherein the program code further comprises instructions to determine a position estimate for the UE based on the measurement information in the location information report received from the network node.

Clause 49. The non-transitory storage medium of clause 48, wherein the program code comprising instructions to determine the position estimate for the UE based on the measurement information in the location information report comprise instructions to: weight the measurement information for the PRS resources according to an order of the measurement information for the PRS resources in the location information report; and determine the position estimate based on weighted measurement information for the PRS resources.

Clause 50. The non-transitory storage medium of any of clauses 46-49, wherein the network node is the UE and the PRS resources comprise at least one of downlink PRS transmitted by a base station or sidelink PRS transmitted by a sidelink UE.

Clause 51. The non-transitory storage medium of any of clauses 46-49, wherein the network node is a base station and the PRS resources comprise sounding reference signals transmitted by the UE.

Clause 52. The non-transitory storage medium of any of clauses 46-49, wherein the network node is a sidelink UE and the PRS resources comprise sidelink PRS transmitted by the UE.

Clause 53. The non-transitory storage medium of any of clauses 46-52, wherein an order of the measurement information for the subset of the plurality of the PRS resources in the location information report is based on the measured multipath characteristics of the PRS resources.

Clause 54. The non-transitory storage medium of any of clauses 46-53, wherein the measured multipath characteristics of the PRS resources comprises a number of multipath components detected for the PRS resources.

Clause 55. The non-transitory storage medium of clause 54, wherein the measurement information for each PRS resource is included in the location information report only if the number of multipath components detected is less than a threshold number.

Clause 56. The non-transitory storage medium of any of clauses 46-55, wherein the measured multipath characteristics of the PRS resources comprises a strength metric of multipath components detected for the PRS resources.

Clause 57. The non-transitory storage medium of clause 56, wherein an order of the measurement information for the subset of the plurality of the PRS resources in the location information report is based on the strength metric of the multipath components detected for the PRS resources.

Clause 58. The non-transitory storage medium of any of clauses 56-57, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 59. The non-transitory storage medium of any of clauses 46-58, wherein the measured multipath characteristics of the PRS resources comprises a time domain span of multipath components detected for the PRS resources.

Clause 60. The non-transitory storage medium of any of clauses 46-59, wherein the location information report from the network node with the measurement information for the subset of the plurality of the PRS resources comprises a number of multipath components detected for each PRS resource.

Clause 61. A method performed by a network node in a wireless network for position measurement determination for a user equipment (UE), comprising: receiving positioning assistance data for the UE from a location server comprising configuration information for a plurality of positioning reference signal (PRS) resources for the network node to measure; obtaining measurement information for the PRS resources received from other entities in the wireless network; measuring multipath characteristics of the PRS resources; determining a subset of the plurality of the PRS resources for which measurement information is to be included in a location information report based on measured multipath characteristics of the PRS resources; and sending the location information report to the location server including the measurement information for the subset of the plurality of the PRS resources determined based on the measured multipath characteristics of the PRS resources.

Clause 62. The method of clause 61, wherein the network node is the UE and the PRS resources comprise at least one of downlink PRS received from one or more base stations or sidelink PRS received from one or more sidelink UEs.

Clause 63. The method of clause 61, wherein the network node is a base station and the PRS resources comprise sounding reference signals received from the UE.

Clause 64. The method of clause 61, wherein the network node is a sidelink UE and the PRS resources comprise sidelink PRS received from the UE.

Clause 65. The method of any of clauses 61-64, further comprising receiving a request from the location server indicating that the UE is to determine the subset of the plurality of the PRS resources for which the measurement information is to be included in the location information report based on the measured multipath characteristics of the PRS resources.

Clause 66. The method of clause 65, wherein the request is a request for a location information report for position determination of the UE.

Clause 67. The method of any of clauses 61-66, wherein measuring multipath characteristics of the PRS resources comprises determining a number of multipath components for each PRS resource.

Clause 68. The method of clause 67, wherein determining the number of multipath components for each PRS resource comprises: determining a strength metric for each multipath component candidate for each PRS resource; and determining the number of multipath components for each PRS resource based on the strength metric for each multipath component candidate for each PRS resource.

Clause 69. The method of any of clauses 61-68, wherein an order of the measurement information for the subset of the plurality of the PRS resources in the location information report is based on the measured multipath characteristics of the PRS resources.

Clause 70. The method of any of clauses 61-69, wherein the measured multipath characteristics of the PRS resources comprises a number of multipath components detected for the PRS resources.

Clause 71. The method of clause 70, wherein the measurement information for each PRS resource is included in the location information report only if the number of multipath components detected is less than a threshold number.

Clause 72. The method of any of clauses 61-71, wherein the measured multipath characteristics of the PRS resources comprises a strength metric of multipath components detected for the PRS resources.

Clause 73. The method of clause 72, wherein an order of the measurement information for the subset of the plurality of the PRS resources in the location information report is based on the strength metric of the multipath components detected for the PRS resources.

Clause 74. The method of any of clauses 72-73, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 75. The method of any of clauses 61-74, wherein the measured multipath characteristics of the PRS resources comprises a time domain span of multipath components detected for the PRS resources.

Clause 76. The method of any of clauses 61-75, further comprising including a number of multipath components detected for each PRS resource in the location information report.

Clause 77. A network node in a wireless network configured for position measurement determination for a user equipment (UE), comprising: an external interface comprising at least one of a wireless transceiver and a communications interface configured to communicate with other entities in the wireless network; at least one memory; at least one processor coupled to the external interface and the at least one memory, wherein the at least one processor is configured to: receive, via the external interface, positioning assistance data for the UE from a location server comprising configuration information for a plurality of positioning reference signal (PRS) resources for the network node to measure; obtain, via the external interface, measurement information for the PRS resources received from the other entities in the wireless network; measure multipath characteristics of the PRS resources; determine a subset of the plurality of the PRS resources for which measurement information is to be included in a location information report based on measured multipath characteristics of the PRS resources; and send, via the external interface, the location information report to the location server including the measurement information for the subset of the plurality of the PRS resources determined based on the measured multipath characteristics of the PRS resources.

Clause 78. The network node of clause 77, wherein the network node is the UE and the PRS resources comprise at least one of downlink PRS received from one or more base stations or sidelink PRS received from one or more sidelink UEs.

Clause 79. The network node of clause 77, wherein the network node is a base station and the PRS resources comprise sounding reference signals received from the UE.

Clause 80. The network node of clause 77, wherein the network node is a sidelink UE and the PRS resources comprise sidelink PRS received from the UE.

Clause 81. The network node of any of clauses 77-80, wherein the at least one processor is further configured to receive, via the external interface, a request from the location server indicating that the UE is to determine the subset of the plurality of the PRS resources for which the measurement information is to be included in the location information report based on the measured multipath characteristics of the PRS resources.

Clause 82. The network node of clause 81, wherein the request is a request for a location information report for position determination of the UE.

Clause 83. The network node of any of clauses 77-82, wherein the at least one processor is configured to measure multipath characteristics of the PRS resources by being configured to determine a number of multipath components for each PRS resource.

Clause 84. The network node of any of clauses 77-83, wherein the at least one processor is configured to determine the number of multipath components for each PRS resource by being configured to: determine a strength metric for each multipath component candidate for each PRS resource; and determine the number of multipath components for each PRS resource based on the strength metric for each multipath component candidate for each PRS resource.

Clause 85. The network node of any of clauses 77-84, wherein an order of the measurement information for the subset of the plurality of the PRS resources in the location information report is based on the measured multipath characteristics of the PRS resources.

Clause 86. The network node of any of clauses 77-85, wherein the measured multipath characteristics of the PRS resources comprises a number of multipath components detected for the PRS resources.

Clause 87. The network node of clause 86, wherein the measurement information for each PRS resource is included in the location information report only if the number of multipath components detected is less than a threshold number.

Clause 88. The network node of any of clauses 77-87, wherein the measured multipath characteristics of the PRS resources comprises a strength metric of multipath components detected for the PRS resources.

Clause 89. The network node of clause 88, wherein an order of the measurement information for the subset of the plurality of the PRS resources in the location information report is based on the strength metric of the multipath components detected for the PRS resources.

Clause 90. The network node of any of clauses 88-89, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 91. The network node of any of clauses 77-90, wherein the measured multipath characteristics of the PRS resources comprises a time domain span of multipath components detected for the PRS resources.

Clause 92. The network node of any of clauses 77-91, wherein the at least one processor is further configured to include a number of multipath components detected for each PRS resource in the location information report.

Clause 93. A network node in a wireless network configured for position measurement determination for a user equipment (UE), comprising: means for receiving positioning assistance data for the UE from a location server comprising configuration information for a plurality of positioning reference signal (PRS) resources for the network node to measure; means for obtaining measurement information for the PRS resources received from other entities in the wireless network; means for measuring multipath characteristics of the PRS resources; means for determining a subset of the plurality of the PRS resources for which measurement information is to be included in a location information report based on measured multipath characteristics of the PRS resources; and means for sending the location information report to the location server including the measurement information for the subset of the plurality of the PRS resources determined based on the measured multipath characteristics of the PRS resources.

Clause 94. The network node of clause 93, wherein the network node is the UE and the PRS resources comprise at least one of downlink PRS received from one or more base stations or sidelink PRS received from one or more sidelink UEs.

Clause 95. The network node of clause 93, wherein the network node is a base station and the PRS resources comprise sounding reference signals received from the UE.

Clause 96. The network node of clause 93, wherein the network node is a sidelink UE and the PRS resources comprise sidelink PRS received from the UE.

Clause 97. The network node of any of clauses 93-96, further comprising means for receiving a request from the location server indicating that the UE is to determine the subset of the plurality of the PRS resources for which the measurement information is to be included in the location information report based on the measured multipath characteristics of the PRS resources.

Clause 98. The network node of clause 97, wherein the request is a request for a location information report for position determination of the UE.

Clause 99. The network node of any of clauses 93-98, wherein the means for measuring multipath characteristics of the PRS resources comprises means for determining a number of multipath components for each PRS resource.

Clause 100. The network node of clause 99, wherein the means for determining the number of multipath components for each PRS resource comprises: means for determining a strength metric for each multipath component candidate for each PRS resource; and means for determining the number of multipath components for each PRS resource based on the strength metric for each multipath component candidate for each PRS resource.

Clause 101. The network node of any of clauses 93-100, wherein an order of the measurement information for the subset of the plurality of the PRS resources in the location information report is based on the measured multipath characteristics of the PRS resources.

Clause 102. The network node of any of clauses 93-101, wherein the measured multipath characteristics of the PRS resources comprises a number of multipath components detected for the PRS resources.

Clause 103. The network node of clause 102, wherein the measurement information for each PRS resource is included in the location information report only if the number of multipath components detected is less than a threshold number.

Clause 104. The network node of any of clauses 93-103, wherein the measured multipath characteristics of the PRS resources comprises a strength metric of multipath components detected for the PRS resources.

Clause 105. The network node of clause 104, wherein an order of the measurement information for the subset of the plurality of the PRS resources in the location information report is based on the strength metric of the multipath components detected for the PRS resources.

Clause 106. The network node of any of clauses 104-105, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 107. The network node of any of clauses 93-106, wherein the measured multipath characteristics of the PRS resources comprises a time domain span of multipath components detected for the PRS resources.

Clause 108. The network node of any of clauses 93-107, further comprising means for including a number of multipath components detected for each PRS resource in the location information report.

Clause 109. A non-transitory storage medium including program code stored thereon, the program code is operable to configure at least one processor in a network node in a wireless network for position measurement determination for a user equipment (UE), the program code comprising instructions to: receive positioning assistance data for the UE from a location server comprising configuration information for a plurality of positioning reference signal (PRS) resources for the network node to measure; obtain measurement information for the PRS resources received from other entities in the wireless network; measure multipath characteristics of the PRS resources; determine a subset of the plurality of the PRS resources for which measurement information is to be included in a location information report based on measured multipath characteristics of the PRS resources; and send the location information report to the location server including the measurement information for the subset of the plurality of the PRS resources determined based on the measured multipath characteristics of the PRS resources.

Clause 110. The non-transitory storage medium of clause 109, wherein the network node is the UE and the PRS resources comprise at least one of downlink PRS received from one or more base stations or sidelink PRS received from one or more sidelink UEs.

Clause 111. The non-transitory storage medium of clause 109, wherein the network node is a base station and the PRS resources comprise sounding reference signals received from the UE.

Clause 112. The non-transitory storage medium of clause 109, wherein the network node is a sidelink UE and the PRS resources comprise sidelink PRS received from the UE.

Clause 113. The non-transitory storage medium of any of clauses 109-112, wherein the program code further comprises instructions to receive a request from the location server indicating that the UE is to determine the subset of the plurality of the PRS resources for which the measurement information is to be included in the location information report based on the measured multipath characteristics of the PRS resources.

Clause 114. The non-transitory storage medium of clause 113, wherein the request is a request for a location information report for position determination of the UE.

Clause 115. The non-transitory storage medium of any of clauses 109-114, wherein the program code further comprises instructions to measure multipath characteristics of the PRS resources by being configured to determine a number of multipath components for each PRS resource.

Clause 116. The non-transitory storage medium of clause 115, wherein the program code comprising instructions to determine the number of multipath components for each PRS resource further comprises instructions to: determine a strength metric for each multipath component candidate for each PRS resource; and determine the number of multipath components for each PRS resource based on the strength metric for each multipath component candidate for each PRS resource.

Clause 117. The non-transitory storage medium of any of clauses 109-116, wherein an order of the measurement information for the subset of the plurality of the PRS resources in the location information report is based on the measured multipath characteristics of the PRS resources.

Clause 118. The non-transitory storage medium of any of clauses 109-117, wherein the measured multipath characteristics of the PRS resources comprises a number of multipath components detected for the PRS resources.

Clause 119. The non-transitory storage medium of clause 118, wherein the measurement information for each PRS resource is included in the location information report only if the number of multipath components detected is less than a threshold number.

Clause 120. The non-transitory storage medium of any of clauses 109-119, wherein the measured multipath characteristics of the PRS resources comprises a strength metric of multipath components detected for the PRS resources.

Clause 121. The non-transitory storage medium of clause 120, wherein an order of the measurement information for the subset of the plurality of the PRS resources in the location information report is based on the strength metric of the multipath components detected for the PRS resources.

Clause 122. The non-transitory storage medium of any of clauses 120-121, wherein the strength metric of the multipath components detected for each PRS resource comprises at least one of a relative power of each multipath components with respect to an earliest multipath component, a median power of the multipath components with respect to a power of the earliest multipath component, the median power of the multipath components with respect to a noise floor, or a combination thereof.

Clause 123. The non-transitory storage medium of any of clauses 109-122, wherein the measured multipath characteristics of the PRS resources comprises a time domain span of multipath components detected for the PRS resources.

Clause 124. The non-transitory storage medium of any of clauses 109-123, wherein the program code further comprises instructions to include a number of multipath components detected for each PRS resource in the location information report.

Therefore, it is intended that claimed subject matter not be limited to the particular examples disclosed, but that such claimed subject matter may also include all aspects falling within the scope of appended claims, and equivalents thereof.

What is claimed is:

1. A method performed by a location server in a wireless network for position determination of a user equipment (UE) in the wireless network, comprising:

sending positioning assistance data for the UE to a network node comprising configuration information for a plurality of positioning reference signal (PRS) resources for the network node to measure;

sending a request to the network node indicating that the network node is to determine a subset of the plurality of the PRS resources for which measurement information is to be included in a location information report based on measured multipath characteristics of the PRS resources; and receiving the location information report from the network node including the measurement information for the subset of the plurality of the PRS resources based on the measured multipath characteristics of the PRS resources.

2. The method of claim 1, wherein the request to the network node is a request for a location information report for position determination of the UE.

3. The method of claim 1, further comprising: determining a position estimate for the UE based on the measurement information in the location information report received from the network node.

4. The method of claim 1, wherein an order of the measurement information for the subset of the plurality of the PRS resources in the location information report is based on the measured multipath characteristics of the PRS resources.

5. The method of claim 1, wherein the measured multipath characteristics of the PRS resources comprises a number of multipath components detected for the PRS resources.

6. The method of claim 1, wherein the measured multipath characteristics of the PRS resources comprises a strength metric of multipath components detected for the PRS resources.

7. The method of claim 1, wherein the measured multipath characteristics of the PRS resources comprises a time domain span of multipath components detected for the PRS resources.

8. The method of claim 1, wherein the location information report from the network node with the measurement information for the subset of the plurality of the PRS resources comprises a number of multipath components detected for each PRS resource.

9. A location server in a wireless network configured for position determination of a user equipment (UE) in the wireless network, comprising:

an external interface configured to communicate with entities in the wireless network;

at least one memory;

at least one processor coupled to the external interface and the at least one memory, wherein the at least one processor is configured to:

send, via the external interface, positioning assistance data for the UE to a network node comprising configuration information for a plurality of positioning reference signal (PRS) resources for the network node to measure;

send, via the external interface, a request to the network node indicating that the network node is to determine a subset of the plurality of the PRS resources for which measurement information is to be included in a location information report based on measured multipath characteristics of the PRS resources; and receive, via the external interface, the location information report from the network node including the measurement information for the subset of the plurality of the PRS resources based on the measured multipath characteristics of the PRS resources.

10. The location server of claim 9, wherein the request to the network node is a request for a location information report for position determination of the UE.

11. The location server of claim 9, wherein the at least one processor is further configured to determine a position estimate for the UE based on the measurement information in the location information report received from the network node.

12. The location server of claim 9, wherein an order of the measurement information for the subset of the plurality of the PRS resources in the location information report is based on the measured multipath characteristics of the PRS resources.

13. The location server of claim 9, wherein the measured multipath characteristics of the PRS resources comprises a number of multipath components detected for the PRS resources.

14. The location server of claim 9, wherein the measured multipath characteristics of the PRS resources comprises a strength metric of multipath components detected for the PRS resources.

15. The location server of claim 9, wherein the measured multipath characteristics of the PRS resources comprises a time domain span of multipath components detected for the PRS resources.

16. The location server of claim 9, wherein the location information report from the network node with the measurement information for the subset of the plurality of the PRS resources comprises a number of multipath components detected for each PRS resource.

17. A method performed by a network node in a wireless network for position measurement determination for a user equipment (UE), comprising:

receiving positioning assistance data for the UE from a location server comprising configuration information for a plurality of positioning reference signal (PRS) resources for the network node to measure;

obtaining measurement information for the PRS resources received from other entities in the wireless network;

measuring multipath characteristics of the PRS resources;

determining a subset of the plurality of the PRS resources for which measurement information is to be included in a location information report based on measured multipath characteristics of the PRS resources; and sending the location information report to the location server including the measurement information for the subset of the plurality of the PRS resources determined based on the measured multipath characteristics of the PRS resources.

18. The method of claim 17, further comprising receiving a request from the location server indicating that the UE is to determine the subset of the plurality of the PRS resources for which the measurement information is to be included in the location information report based on the measured multipath characteristics of the PRS resources.

19. The method of claim 18, wherein the request is a request for a location information report for position determination of the UE.

20. The method of claim 17, wherein measuring multipath characteristics of the PRS resources comprises determining a number of multipath components for each PRS resource.

21. The method of claim 17, wherein an order of the measurement information for the subset of the plurality of the PRS resources in the location information report is based on the measured multipath characteristics of the PRS resources.

22. The method of claim 17, wherein the measured multipath characteristics of the PRS resources comprises a number of multipath components detected for the PRS resources.

23. The method of claim 17, wherein the measured multipath characteristics of the PRS resources comprises a strength metric of multipath components detected for the PRS resources.

24. The method of claim 17, wherein the measured multipath characteristics of the PRS resources comprises a time domain span of multipath components detected for the PRS resources.

25. The method of claim 17, further comprising including a number of multipath components detected for each PRS resource in the location information report.

26. A network node in a wireless network configured for position measurement determination for a user equipment (UE), comprising:

an external interface comprising at least one of a wireless transceiver and a communications interface configured to communicate with other entities in the wireless network;

at least one memory;

at least one processor coupled to the external interface and the at least one memory, wherein the at least one processor is configured to:

receive, via the external interface, positioning assistance data for the UE from a location server comprising configuration information for a plurality of positioning reference signal (PRS) resources for the network node to measure;

obtain, via the external interface, measurement information for the PRS resources received from the other entities in the wireless network;

measure multipath characteristics of the PRS resources;

determine a subset of the plurality of the PRS resources for which measurement information is to be included in a location information report based on measured multipath characteristics of the PRS resources; and send, via the external interface, the location information report to the location server including the measurement information for the subset of the plurality of the PRS resources determined based on the measured multipath characteristics of the PRS resources.

27. The network node of claim 26, wherein the at least one processor is further configured to receive, via the external interface, a request from the location server indicating that the UE is to determine the subset of the plurality of the PRS resources for which the measurement information is to be included in the location information report based on the measured multipath characteristics of the PRS resources.

28. The network node of claim 27, wherein the request is a request for a location information report for position determination of the UE.

29. The network node of claim 27, wherein the at least one processor is configured to measure multipath characteristics of the PRS resources by being configured to determine a number of multipath components for each PRS resource.

30. The network node of claim 26, wherein an order of the measurement information for the subset of the plurality of the PRS resources in the location information report is based on the measured multipath characteristics of the PRS resources.

31. The network node of claim 26, wherein the measured multipath characteristics of the PRS resources comprises a number of multipath components detected for the PRS resources.

32. The network node of claim 26, wherein the measured multipath characteristics of the PRS resources comprises a strength metric of multipath components detected for the PRS resources.

33. The network node of claim 26, wherein the measured multipath characteristics of the PRS resources comprises a time domain span of multipath components detected for the PRS resources.

34. The network node of claim 26, wherein the at least one processor is further configured to include a number of multipath components detected for each PRS resource in the location information report.

* * * * *